United States Patent [19]
Blakely et al.

[11] Patent Number: 4,516,845
[45] Date of Patent: May 14, 1985

[54] SECURITY CONTROL SYSTEM AND METHOD FOR IDENTIFICATION CARD CAMERAS

[75] Inventors: Linda L. Blakely, Belmont; John C. Goodman, Marblehead; David B. Walker, Belmont, all of Mass.

[73] Assignee: Polaroid Corporation, Cambridge, Mass.

[21] Appl. No.: 605,618

[22] Filed: Apr. 30, 1984

Related U.S. Application Data

[63] Continuation-in-part of Ser. No. 538,375, Oct. 3, 1983, abandoned.

[51] Int. Cl.³ .............................................. G03B 17/24
[52] U.S. Cl. .................... 354/412; 354/418; 354/109; 364/525; 358/244
[58] Field of Search ............... 354/412, 418, 105–109, 354/110, 118–120; 355/39, 40, 41; 352/46, 55; 378/162–166; 364/525; 346/110 R; 358/244

[56] References Cited
U.S. PATENT DOCUMENTS

| | | | |
|---|---|---|---|
| 3,631,773 | 1/1972 | Moodie | 95/1.1 |
| 3,696,716 | 10/1972 | Pasieka | 95/1.1 |
| 3,796,485 | 3/1974 | Seiden | 354/88 |
| 3,838,435 | 9/1974 | Mepham | 354/109 |
| 3,928,863 | 12/1975 | Stewart et al. | 354/109 |
| 4,248,510 | 2/1981 | Baker et al. | 354/109 |

Primary Examiner—William B. Perkey
Attorney, Agent, or Firm—David R. Thornton

[57] ABSTRACT

An identification card camera for producing photoprint identification cards having a subject portrait and subject related data in respective areas of the card and a record film of the card includes a cyclically operable imaging system by which an image of a data carrying card is exposed to a first area of the identification card film and a first frame of a record film and an image of the subject is exposed to a second area of the identification card film and to a second frame of the record film. A microprocessor based logic system controls the imaging system to produce the identification card and the record film frames and monitors operation of the imaging system. Camera operation is terminated if an unexpected change in the operational status of the data carrying card, identification card film, record film, or other components of the imaging system is detected during execution of the camera cycle.

25 Claims, 29 Drawing Figures

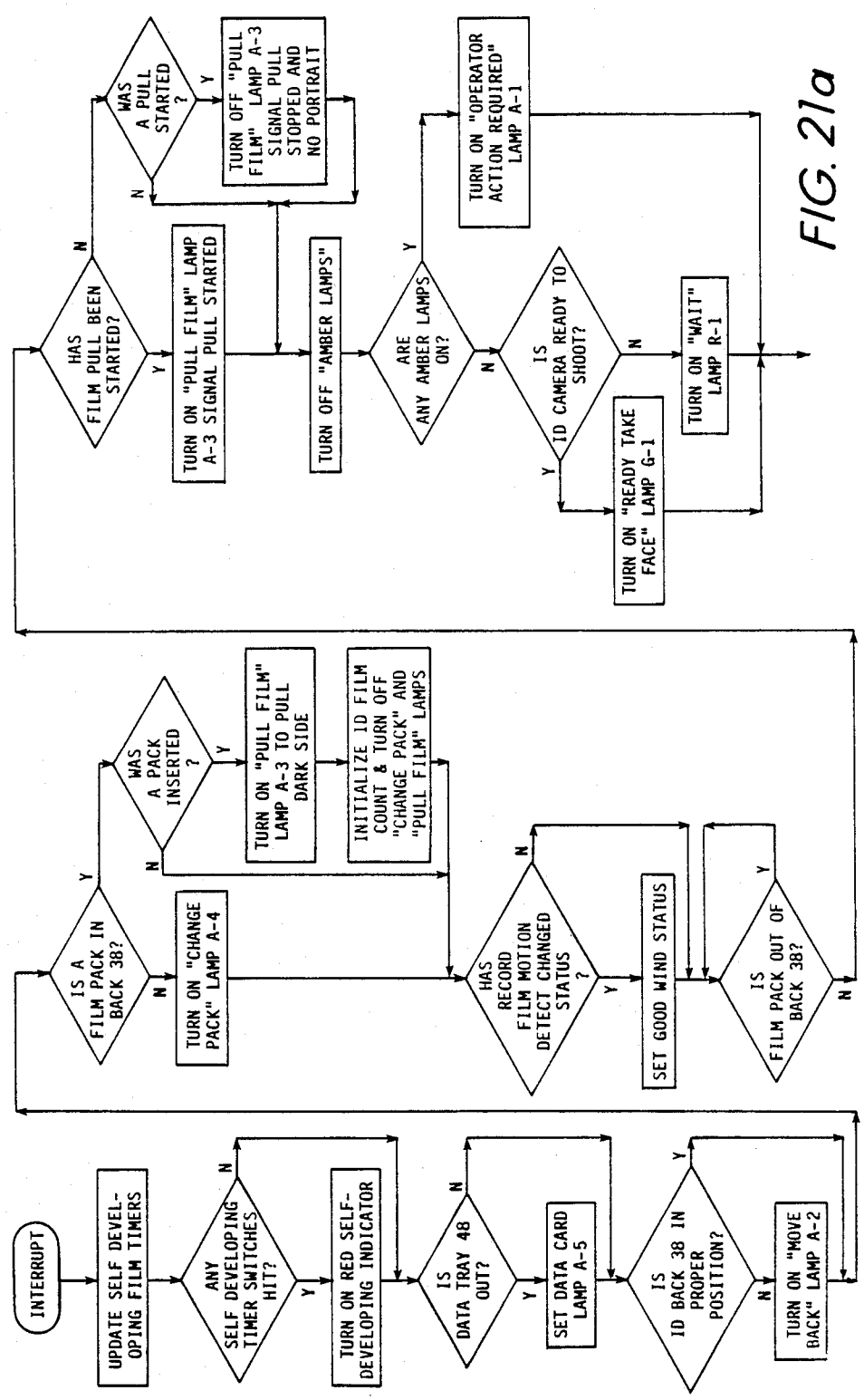

SECURITY CONTROL SYSTEM AND METHOD FOR IDENTIFICATION CARD CAMERAS

CROSS-REFERENCE TO RELATED APPLICATION

This application is a continuation-in-part of U.S. patent application Ser. No. 538,375, filed Oct. 3, 1983, now abandoned.

BACKGROUND OF THE INVENTION

1. Field of the Invention

This invention relates to composite subject/data identification cards. More particularly, it concerns a method and system of apparatus for providing such cards together with a film strip record of not only all information recorded on each card, but additional subject identifying information and data in a format which can be readily correlated to each identification card.

2. Description of the Prior Art

Camera systems for providing identification cards containing a photograph of a subject to whom the card applies, as well as other printed or graphic data, are well known in the art. Systems currently used extensively by numerous private and governmental organizations are exemplified by the disclosures of U.S. Pat. Nos. 3,631,773; 3,641,886; 3,678,818; 3,683,764; 3,696,716; 3,726,198 and 3,762,292. Such systems typically employ a dual optical path for presenting to the film plane of an instant camera, for example, light images representing both a portrait of the subject to be identified by the identification card as well as printed or graphic data applicable to the subject and/or to the organization issuing the card. Areas of the card reserved for the respective subject and data images are delineated by a masking arrangement of orthogonally polarized light paths in combination with a polarizing plate at the film plane of the camera to which both the subject and data images are presented. The polarizing plate may carry indicia symbolizing the authentication of the card issuing organization such as a validating signature or seal, either of which may be arranged to partially overlie both the subject and data images recorded on the ultimate identification card.

The administration of central file records by which the issuance of each identification card as well as retention of information pertaining to the subject of each card is an important adjunct to the use of identification card camera systems. While the data carrier, usually in the form of a file card, which is used in the production of each identification card serves as a file record, in itself, it has been recognized in the art that the data card is incomplete without inclusion also of a portrait of the subject to whom it applies. To accommodate this need, identification card camera systems have been developed to include a record filmstrip on which all information presented on the composite subject/data format of each successive identification card is recorded in successive frames on the record filmstrip. The disclosure of U.S. Pat. No. 4,248,510 is exemplary of a camera system employing such a record filmstrip. Other similar camera systems have been proposed and in each such system, the record filmstrip serves as a central file record by which the authenticity of the originally issued composite/data identification card can be verified.

In prior identification card camera systems, direct facsimile identification of the subject to whom the card applies has been restricted to the photograph of the subject and a facsimile of the subject's written signature. Many organizations require additional facsimile identification such as a fingerprint or the like. Given the size of an identification card which has evolved through tradition as well as for ease of carrying and handling, it is difficult if not impossible to reproduce photographically the combination of data, portraiture and a viable fingerprint on the format of an identification card. The resolution required for a useful photographic reproduction of a fingerprint is, in itself, severely restrictive from a standpoint of image size reduction. In prior systems, where the complete information presented on the composite subject/data identification card is recorded on a record filmstrip, the reproduction of such auxiliary physical identifying data has been precluded out of the limited space available on the identification card.

Another problem which has been presented in the use and administration of identification card camera systems is the lack of security associated with the multiples of personnel in a given organization having access to the camera system. In the systems which are presently available, for example, it is possible for a dishonest employee in an organization to falsify the information on a data card and provide to a given subject an identification card which otherwise cannot be detected as less than authentic. There is a need, therefore, not only for an identification card camera system which may accommodate additional forms of physical identifying data for a given subject as well as a system which affords increased security against unauthorized operation.

SUMMARY OF THE INVENTION

In accordance with the present invention, a photographic identification card system and method is provided in which a filmstrip record of each identification card produced is arranged to provide adjacent full-frame images not only of the subject to whom the card is issued but also of a complete data card or carrier inclusive of both card data for reproduction on the composite identification card and of record data applicable to the subject and retained only on the filmstrip record. As a result, complete physical identifying facsimiles such as a portrait, signature and fingerprint may be retained on the filmstrip record and easily correlated to each issued identification card.

The system for practicing the invention is embodied in a single compact and tamper-free housing enclosing an identification card camera, a photorecord camera, a card tray for supporting a data carrier including card data and record data applicable to a given subject, and an optical system by which an image of card data on the carrier may be presented to the identification camera and by which the combined card data and record data may be presented to the record camera. The housing also encloses a microprocessor-based control system by which both cameras may additionally record an image of the subject for the identification card. Operation of both cameras is completely automated for exposure of the respective films contained therein to the data carrier and such operation is initiated by the insertion of the data carrier into the housing by an operator. Photographs of the subject, both by the record camera and by the identification camera are effected simultaneously by manual control of the operator upon being given enunciated information by the system. Also, the system includes a provision for initialization by a supervisor as well as a verification of all supervisor actions on the record filmstrip.

The microprocessor-based control system periodically monitors the operational states of various controlled devices within the camera during its picture taking sequence and terminates the sequence if an unintentional change in state of one of the controlled devices is detected. This feature enhances the security aspect of the camera by detecting any attempt to change the position of or inhibit movement of the various camera components during the picture taking sequence.

A principal object of the present invention is, therefore, the provision of an improved photographic identification card system which may accommodate increased facsimile identification applicable to a subject and which incorporates an enhanced measure of security against fraudulent use. Other objects and further scope of applicability will become apparent from the detailed description to follow, taken in conjunction with the accompanying drawings wherein like parts are designated by like reference numerals.

BRIEF DESCRIPTION OF THE DRAWING

FIGS. 21A and 21B represent a flow diagram of a "Interrupt" instruction sequence periodically entered by the primary instruction sequence of FIGS. 20A and 20B.

DETAILED DESCRIPTION OF THE PREFERRED EMBODIMENTS

Figure 1:
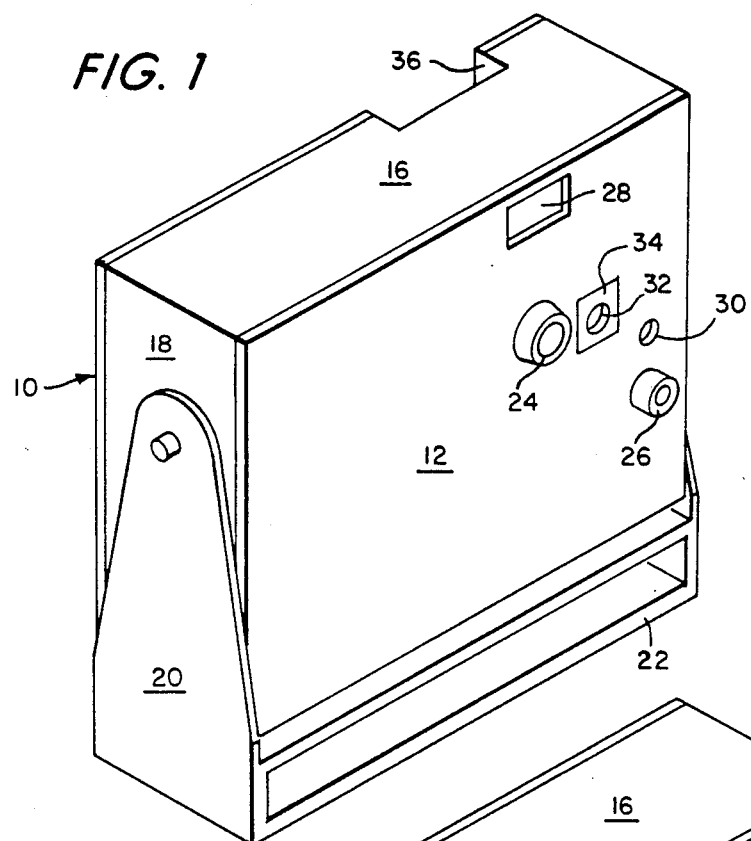
FIG. 1 is a perspective view illustrating the front exterior of a housing containing the system of the present invention.
Figure 2:
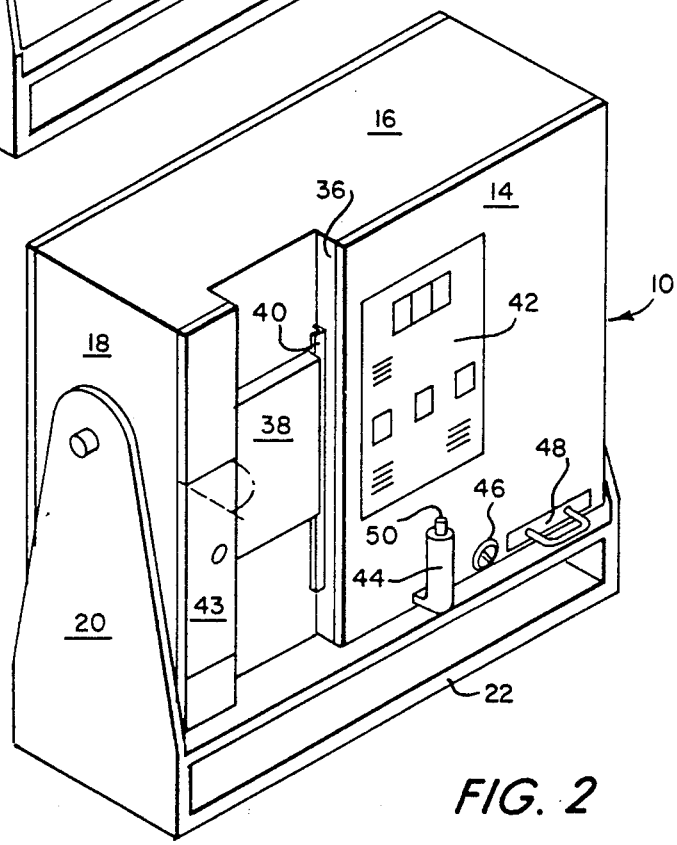
FIG. 2 is a similar perspective view illustrating the rear exterior of the housing.

The several operating components of an identification camera system in accordance with the present invention are supported within a chassis housing generally designated in FIGS. 1 and 2 by the reference numeral 10. The configuration of the chassis housing 10 is a rectangular parallelepiped to provide rectangular front and back walls 12 and 14, respectively, spanned by a top wall 16, end walls 18 and a bottom wall (not shown). The housing 10 is supported pivotally from end plate standards 20 upstanding from a pedestal base 22. Presented at the front wall 12 of the housing 10, as shown in FIG. 1, are an ID camera objective lens 24, a record camera objective lens 26, a subject illuminating strobe lamp 28, a strobe quench photocell 30, and an aim lamp 32. The aim lamp 32 is conventionally employed in commercially available identification cameras and, although not illustrated in the drawings, typically employs a lamp situated behind a focusing fresnel lens. When the lamp is energized, a beam of light issuing therefrom may be positioned on the face of a subject to be photographed through the objective lenses 24 and 26. The aim lamp 32 is positioned behind a door 34 pivotally mounted in the front wall 12 of the housing 10 for access to replace bulbs.

The rear wall 14 is formed with a vertically oriented channel-shaped recess 36 for receiving a self-developing camera back 38 slidably mounted in ways 40 for movement between upper and lower positions in relation to the objective axis of the lens 24. The camera back 38 is also conventionally employed in many commercially available ID cameras and, as such, is adapted to receive a film pack of self-developing film units of a size so that each film unit provides two identification cards. Movement of the camera back 38 to one or the other of the upper and lower positions determines which half of each film unit is to record the identification card, it being understood that each film unit is withdrawn from the back 38 after processing of two identification cards.

Also positioned on the back wall 14 of the housing 10 is an indicator lamp bezel 42, a record filmstrip door 43, an aiming handle 44, an initialization keylock 46, and a data carrier tray 48. While the function of the initialization keylock 46 and data carrier tray 48 will be described in more detail below, it will be noted that the aiming handle 44 carries at its upper end, a pushbutton 50 for actuation of the strobe lamp 28 and shutters (not shown) associated with the objective lenses 24 and 26 to expose ID and record film planes (to be described) to a portrait image of the subject of an identification card. The aiming handle 44 also carries a switch (not shown) for actuating the aim lamp 32.

Figure 3:
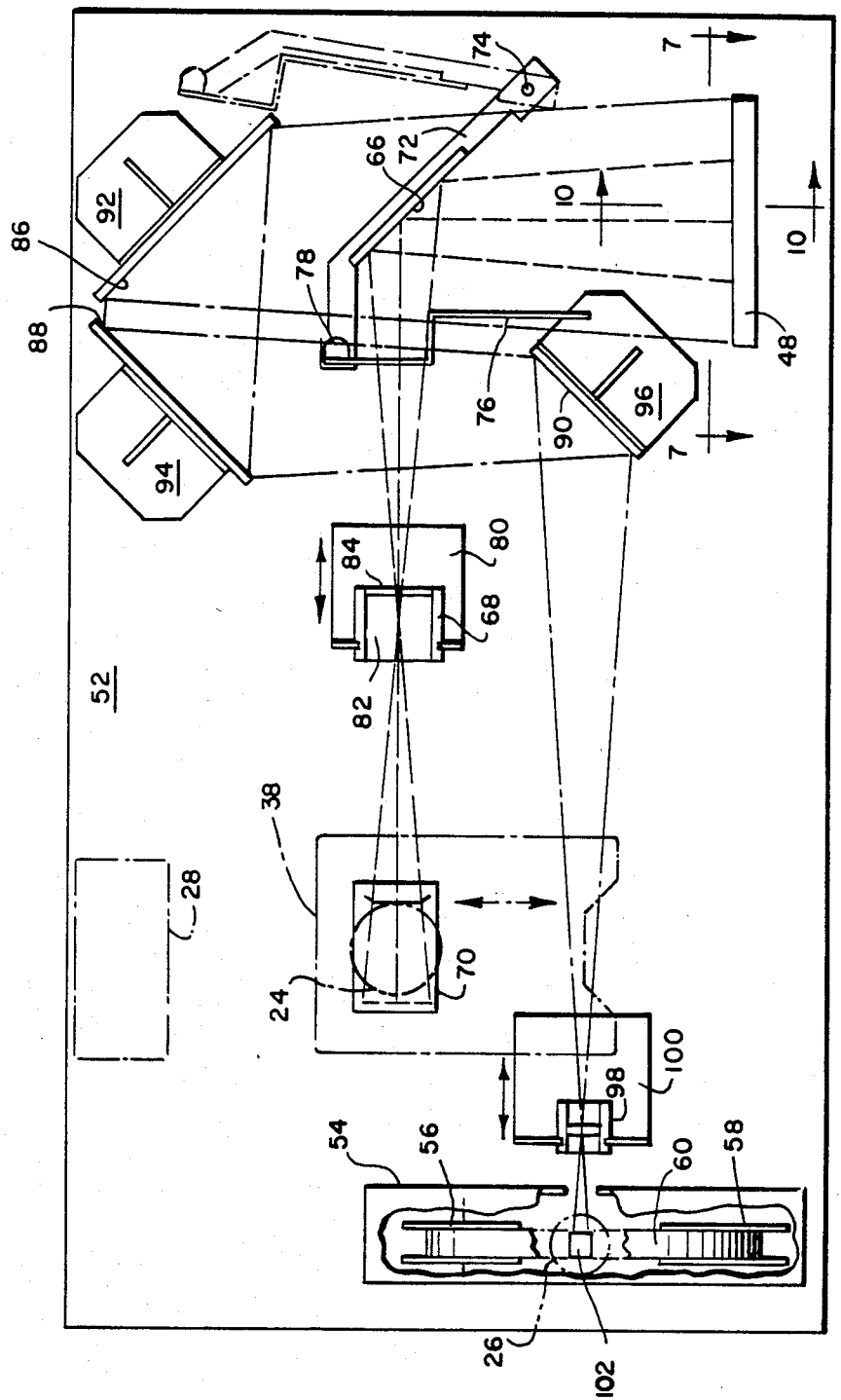
FIG. 3 is a rear elevation illustrating components supported by a chassis plate contained within the housing illustrated in FIGS. 1 and 2.

In FIG. 3 of the drawings, the rear face of a front chassis plate 52 contained within the housing 10 is shown with the relative positions of the objective lenses 24 and 26, the strobe lamp 28 and the ID camera back 38 depicted in outline by phantom lines. A recording camera 54 is supported from the wall 52 behind the objective lens 26 and, as shown in FIG. 3, includes supply and takeup spools 56 and 58, respectively, for feeding a record filmstrip 60 incrementally in frame-by-frame fashion to the axis of the lens 26. The record filmstrip 60 is preferably 16 mm film and may be of a type conventionally employed in motion picture cameras or an unperforated type conventionally employed in microfilm cameras.

Figure 4:
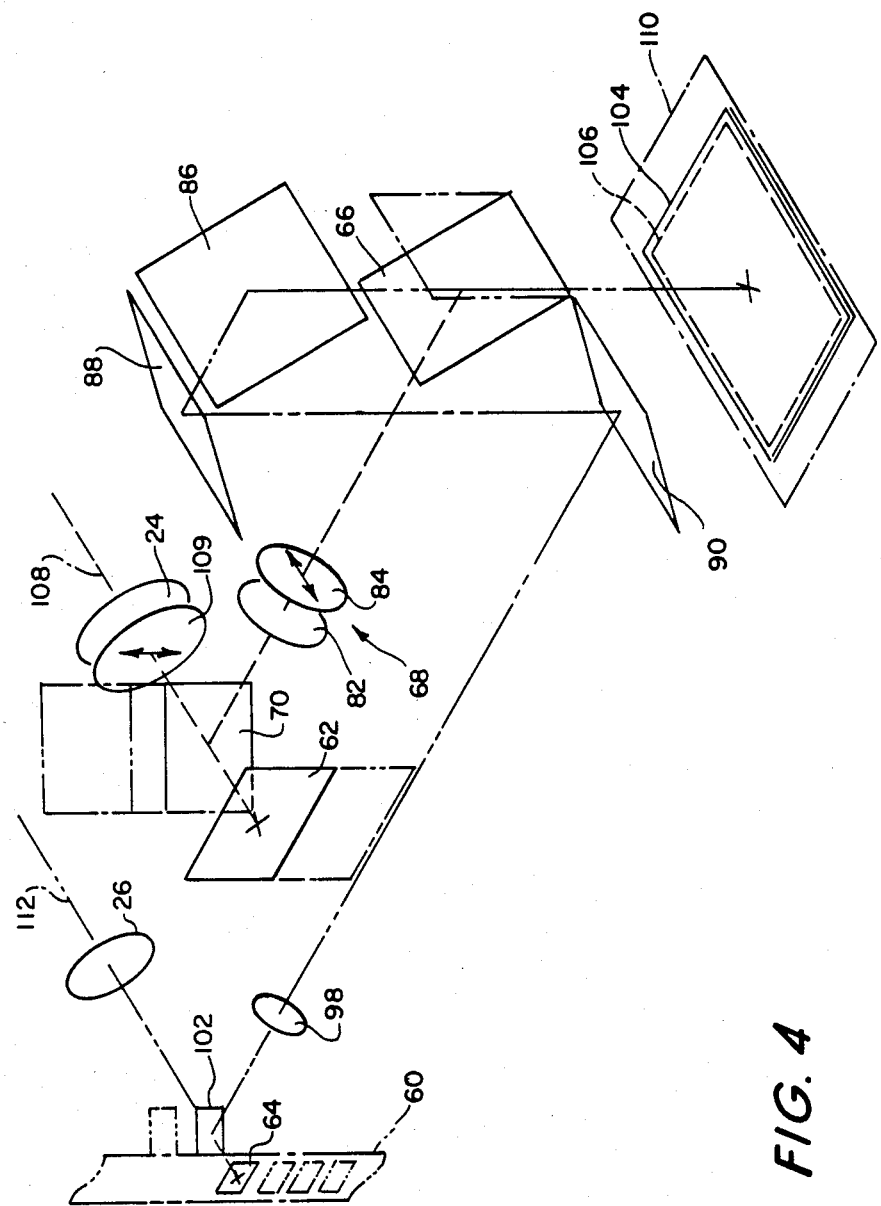
FIG. 4 is a schematic view in perspective illustrating the optical components of the system.

Optical components supported from the chassis plate 52 and by which light directed from the upper surface of the data carrier tray 48 is presented as an image at the film planes 62 and 64 (FIG. 4) of the camera back 38 and record camera 54, respectively, are shown in FIGS. 3 and 4 to include for the ID camera film plane 62, a first moveable mirror 66, an ID data imaging lens unit 68, and a second moveable mirror 70 positioned between the film plane 62 of the ID camera back 38 and the objective lens 24. As shown in FIG. 3, the first moveable mirror 66 is mounted on a bracket 72 pivotally supported at its lower end by a pintel 74 secured in the chassis plate 52 for movement between an operative position, as shown in solid lines in FIG. 3, and an inoperative displaced position depicted in phantom lines. The bracket 72 extends forwardly of the mirror 66 at its upper end to support a shade or mask 76 depending from a pivotal support 78 on the bracket 72 freely so as to assume the position shown in solid lines in FIG. 3 under the influence solely of gravity. When the bracket 72 is moved to its displaced position as represented by phantom lines in FIG. 3, the shade 76 will overlie the mirror 66 to inhibit reflection of stray light.

The lens unit 68 is supported from a bracket 80 adapted to be adjustably fixed against the rear surface of the chassis plate 52 by appropriate means (not shown). In addition to supporting an imaging lens 82, the unit 68 supports a polarized filter 84 oriented on a predetermined axis of polarization to be described in more detail below. In light of the organization of mirrors 66 and 70 together with the lens unit 68, it will be appreciated that light reflected from the top of the data carrier tray 48 will proceed along the dashed lines in FIGS. 3 and 4 to present an image of the top surface of the tray 48 at the film plane 62 of the ID camera back 38.

An image of the top of the tray 48 is presented to the film plane 64 of the record camera 54 by an optical path including first, second and third fixed mirrors 86, 88 and 90, respectively. While the mirrors 86, 88 and 90 are characterized as fixed, they are supported respectively from brackets 92, 94 and 96 so that they may be adjusted to the fixed position in which they are oriented in operation of the system. The optical path between the top of the data carrier tray 48 and the film plane 64 of the record camera 54 further includes a data imaging record lens unit 98 supported by bracket 100 to be adjustably positioned on the back of the chassis plate 52. The image formed by the lens unit 98 is presented to the record camera film plane 64 by a third moveable mirror 102 supported between the lens 26 and the film plane 64.

The system of optical paths to the respective film planes 62 and 64 is shown most clearly in FIG. 4 in which a data carrier in the form of a rectangular card 104, adapted to be supported at the top of the carrier tray 48, is shown in solid line form. The fields of view presented to the ID film plane 62 and to the record film plane 64 are represented respectively by dashed and dash/dot rectangles superimposed on the card 104. As described above, therefore, an image of a field 106, representing an area substantially the same as or smaller than the card 104, is presented to the ID film plane 62 by the lens 82 upon reflection of light rays directed from the card to the mirror 66, through the lens 82 and the second moveable mirror 70. Movement of the second moveable mirror 70 to the phantom line position illustrated in FIG. 4 permits an image of a subject (not shown) aligned with the axis 108 of the lens 24 to be presented also to the ID film plane 62. It will be noted that a second polarized filter 109 is located on the axis 108 behind the lens 24. Also, the polarization axis of the filter 109 is perpendicular to the polarization axis of the filter 84.

With the first moveable mirror 66 pivoted to its displaced position as represented by phantom lines in FIG. 4, a record field 110 is presented to the record film plane 64 by light directed from the field 110 successively to the fixed mirrors 86, 88 and 90, through the lens 98 to the third moveable mirror 102 and to the film plane 64. With the mirror 102 moved to the phantom line position, the image of the subject on the axis 112 of the record objective lens 26 will be presented also to the record image plane 64.

Figure 5:
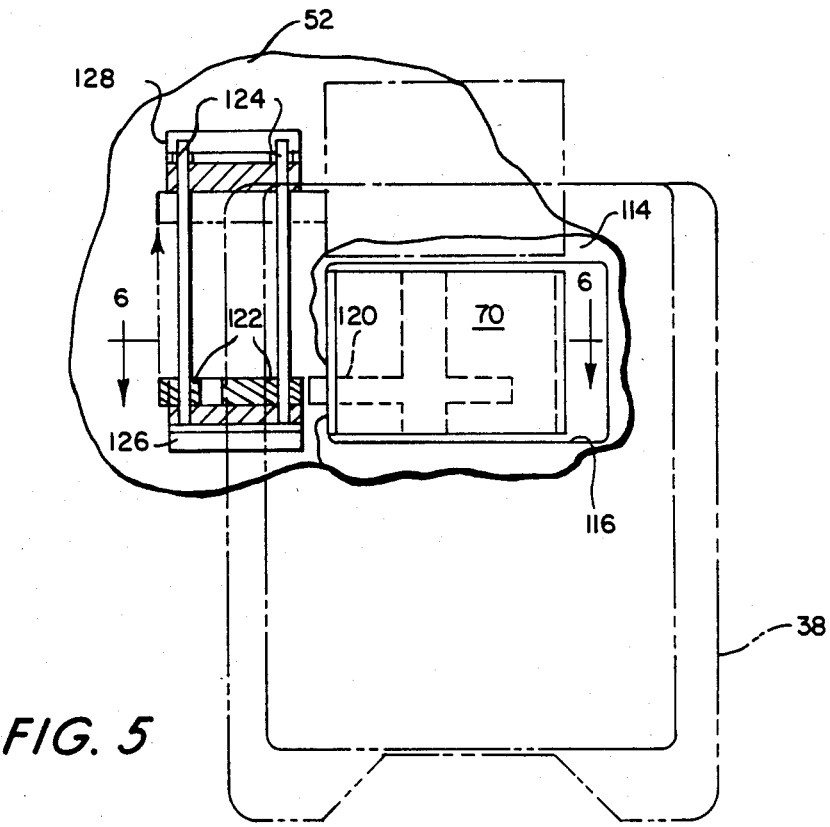
FIG. 5 is a fragmentary rear elevation in partial cross-section showing a mirror support arrangement incorporated in the system.
Figure 6:
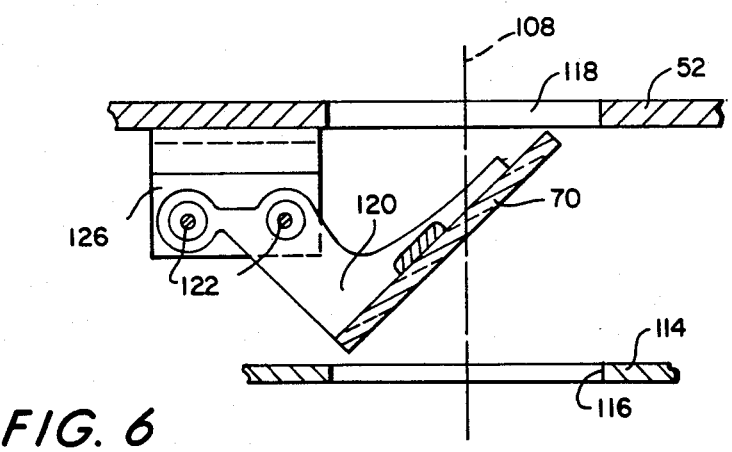
FIG. 6 is a fragmentary cross-section on line 6—6 of FIG. 5.

An exemplary embodiment of a support for the second moveable mirror 70 is illustrated in FIGS. 5 and 6 of the drawings. In these figures, the chassis plate 52 is again shown in part and further, as being spaced forwardly of a filmpack mask 114 having a rectangular opening 116. Also, it will be noted that the chassis plate 52 is provided with an opening 118 which, like the opening 116, is aligned on the axis 108 of the ID objective lens 24.

The mirror 70 is supported from a cast bracket 120 having a pair of circular bushings 122 adapted to slidably receive a pair of parallel vertical rods 124. The rods 124 are anchored at their base in a support bracket 126 and at their upper ends in a support bracket 128, both such brackets being secured to the back of the chassis plate 52. Though not illustrated in the drawings, it will be appreciated that this mounting arrangement for the mirror 70 facilitates its movement by means of a solenoid (not shown) or the like, as well as accurate positioning thereof, particularly in its operative lower position on the axis 108.

While details of the support for the third moveable mirror 102 for movement between an operative position on the record objective axis 112 and an inoperative elevated position are not shown in the drawings, it will be appreciated that this mirror may be supported similarly as the described support for the mirror 70. Also, either one or both of the mirrors 70 and 102 may be pivotally supported in the manner of conventional reflex mirrors though the support thereof on ways or equivalent is preferred from the standpoint of space conservation and absolute registration.

Figure 7:
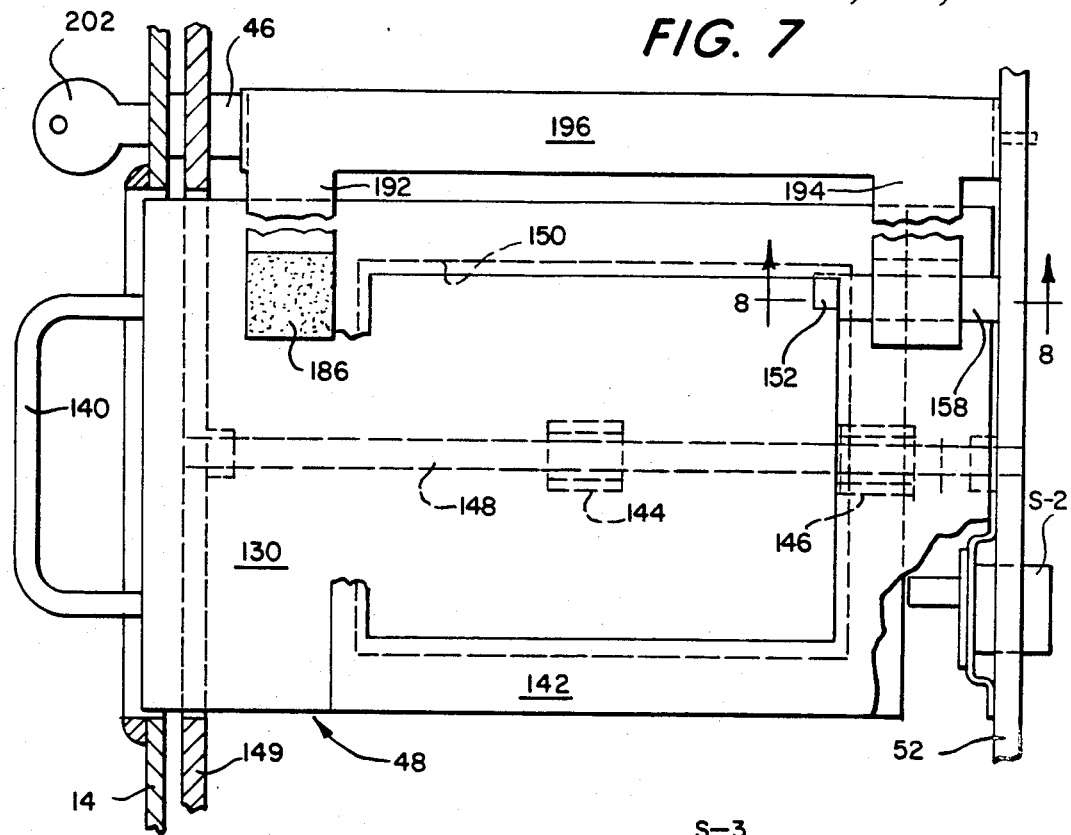
FIG. 7 is an enlarged fragmentary cross-section on line 7—7 of FIG. 3.
Figure 8:
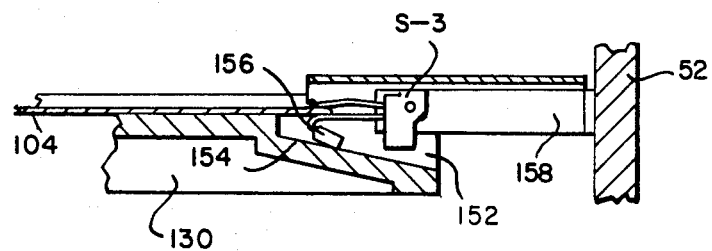
FIG. 8 is an enlarged fragmentary cross-section on line 8—8 of FIG. 7.
Figure 9:
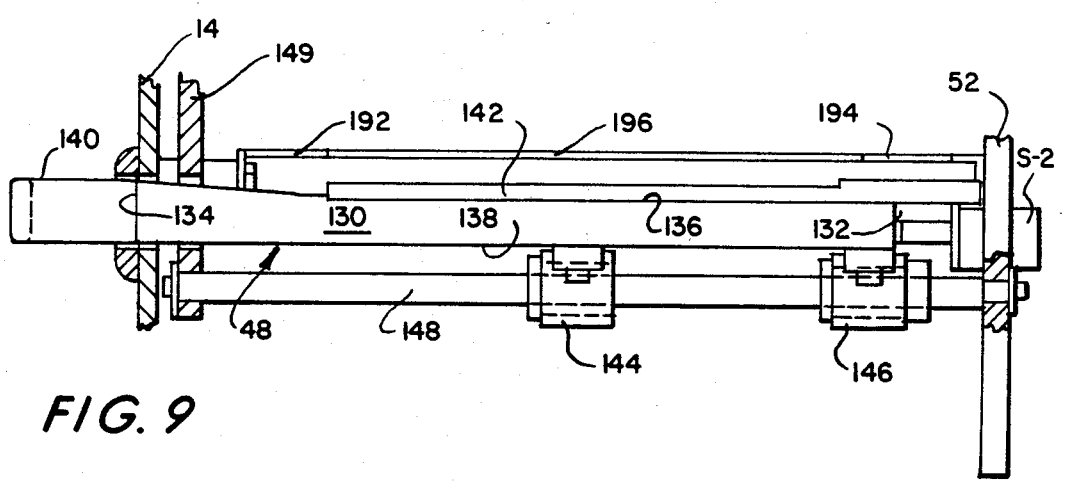
FIG. 9 is a side elevation of the components illustrated in FIG. 7.

The construction of the tray 48 and related chassis-supported components is illustrated most clearly in FIGS. 7-9 of the drawings. The tray 48 structure includes a molded base 130 having front and rear edges 132 and 134, as well as top and bottom surfaces 136 and 138, respectively. A handle 140 is secured to the rear edge 132 whereas a generally U-shaped tray cap 142 projects forwardly of the front edge 132 of the base 130. To the bottom surface 138 of the tray body 130 are secured a pair of guide bushings 144 and 146 for slidably engaging a guide rod 148 secured at opposite ends in the front chassis plate 52 and in a rear chassis plate 149. In light of this organization, it will be appreciated that the tray 48 is permanently secured within the housing 10 but is moveable between an operative position as shown in FIGS. 7-9 and an inoperative or retracted position in which it is drawn outwardly from the rear wall 14 of the housing until the bushing 144 engages the rear chassis plate 149. In the retracted position, a data carrier such as the data card 104 may be placed into and secured by the tray cover for presentation at the top surface of the tray body 130. To this end, the tray cap 142 is provided with an undercut lip 150 to engage the peripheral edges of a card placed thereinto.

As shown in FIGS. 7 and 8, the front left corner of the tray body 130 is provided with a forwardly opening recess 152 which extends rearwardly to a point beyond the front edge of a card 104 properly oriented in place on the tray 48. The recess 152 defines a rearwardly and upwardly inclined ramp 154 for engagement by a follower component 156 on a switch S-3 supported by a bracket 158 from the front chassis wall 52. The card 104 will prevent closure of the switch S-3 when properly positioned in the tray 48. If a card is not present or if the card is not properly positioned by the tray cap 142, movement of the tray 48 toward the front chassis plate 52 will result in closure of the switch S-3 to indicate this abnormality. Another switch S-2 is supported from the front chassis plate 52 in a position to be engaged by the front edge 132 of the tray body 130 when the tray 48 is advanced fully into its operative position as shown in both FIGS. 7 and 9 of the drawings. As will be described in more detail below, the closure of the switch S-2 initiates a data recording portion of the identification card cycle carried out by the system of the present invention.

Figure 10:
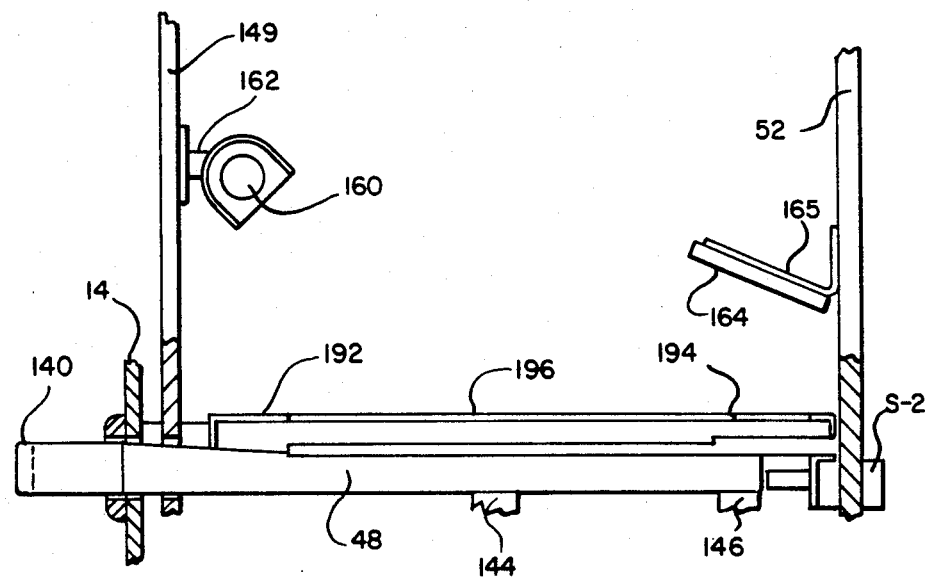
FIG. 10 is an enlarged fragmentary cross-section on line 10—10 of FIG. 3.
Figure 11:
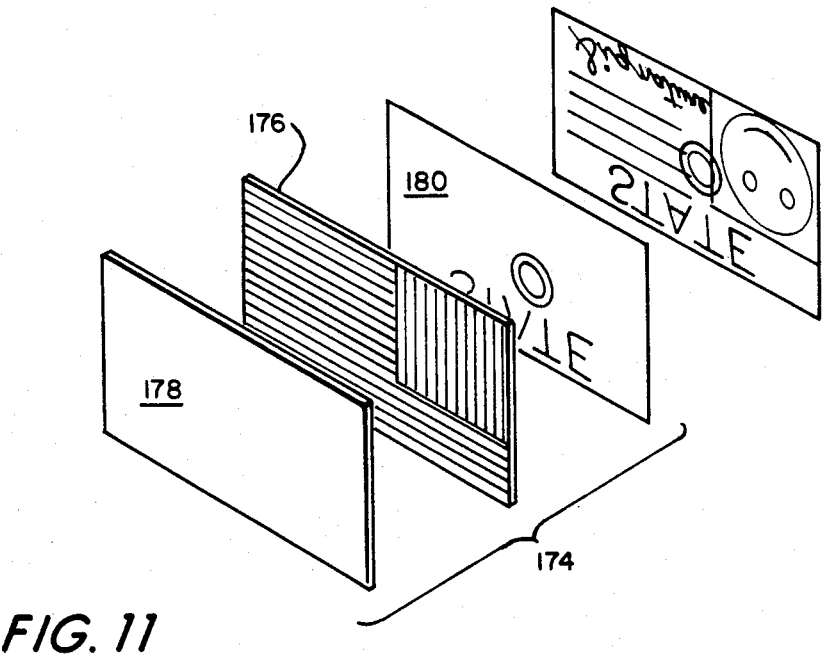
FIG. 11 is an exploded perspective view illustrating the polarizer and negative of the identification card produced by the system of the present invention.
Figure 12:
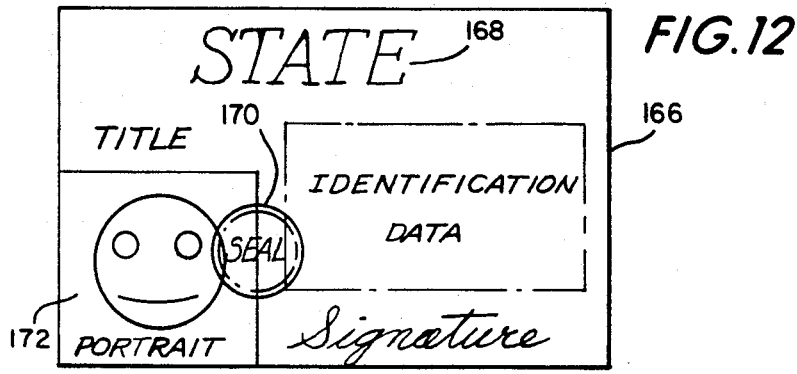
FIG. 12 is a positive image of an exemplary identification card produced by the present invention.

In FIG. 10, a source of illumination for the upper surface of the tray 48 is illustrated to include a data strobe lamp 160 secured by a bracket 162 to the front of the rear chassis plate 149 and reflecting mirror 164 supported by a bracket 165 from the rear of the front chassis plate 52. The strobe lamp 160 is directed downwardly to the top surface of the tray 48 at an angle ranging from 30° to 45° to the vertical, whereas the reflecting surface of the mirror 164 is oriented at between 15° and 20° to the vertical. As a result of this organization, light emitted from the strobe unit 160 and directed against the top of the tray 48 will be augmented by the reflection of light from the mirror 164 back to the top of the tray 48. Light originating with the strobe unit 160 will, of course, be the light from which the image of a data carrier supported by the tray 48 is presented to both the ID film plane 62 and the record film plane 64 as described above with reference to FIGS. 3 and 4 of the drawings. As described below, the strobe 160 can be set to one of two different light output levels, one level suitable for exposing the record film 60 frames and the other level for exposing the film at the ID film plane 62. The magnitude of the light necessary at each level is determined, in part, by the sensitivity of the respective ID and record films and the design parameters of the imaging and light controlling elements.

To facilitate an understanding of the manner in which the identification card system and method of the present invention is used in practice, reference is made to FIGS. 11-14 of the drawings which illustrate various data formats incident to such use. Thus, in FIG. 12, an exemplary identification card 166 provided by the invention is illustrated as including three basic types of information; namely, (1) the designation of the identification card issuing agency such as the name of the state 168 and other authority indicating indicia such as a seal 170, (2) a portrait 172 of the subject to whom the identification card 166 applies, and (3) identification data applicable to the subject which may include a photograph of the applicant's signature.

The identification card 166, in itself, predates the present invention and may be formed using a conventional identification camera system equipped with an optical system for simultaneously or sequentially exposing a film unit of the type carried in the film back 38 to an appropriate data card and to the subject. Also, such conventional identification card cameras employ a polarizing plate 174 shown in FIG. 11 to include an orthogonally polarized layer 176 sandwiched between a pair of transparent sheets or plates 178 and 180. The polarizer plate 174 is located at the film plane of the ID camera back 38. The orthogonally polarized component 176 thereof cooperates with the polarized filters 84 and 109 (FIG. 4) so that the subject area of the portrait 172 and the data area for all other data on the identification card 166 and personal to the subject are mutually exclusive. In other words, imaging light passing from a data card to the film plane 62 is blocked from the area 172 reserved for the photograph of the subject on the ultimate card 166 and, similarly, imaging light passing along the axis 108 from the subject of the portrait 172 is blocked or masked by the polarizing plate 174 from the other or data portions of the ultimate ID card 166.

Also, it will be noted that the polarizing plate 174 is customized or validated by supporting on the sheet 180 thereof, indicia to be received on the card 166 and all others like it. In particular, the designation of the card authorizing agency such as the name of the state 168, as well as the state seal 170, are incorporated in the polarizer as a mask to provide an image thereof on the identification card 166. As such, the plate 174 functions as a "validation plate" and will be referred to as such in flow charts illustrated in the drawings. Further, the plate 174 is moveable by means of an electrically operated actuator (not shown) between a "pulled in" position to lie in the film plane 62 and a "released" position spaced from the film plane 62. The released position of the plate allows film units in the back 38 to be pulled therefrom without deleterious contact by the plate 174.

Figure 13:
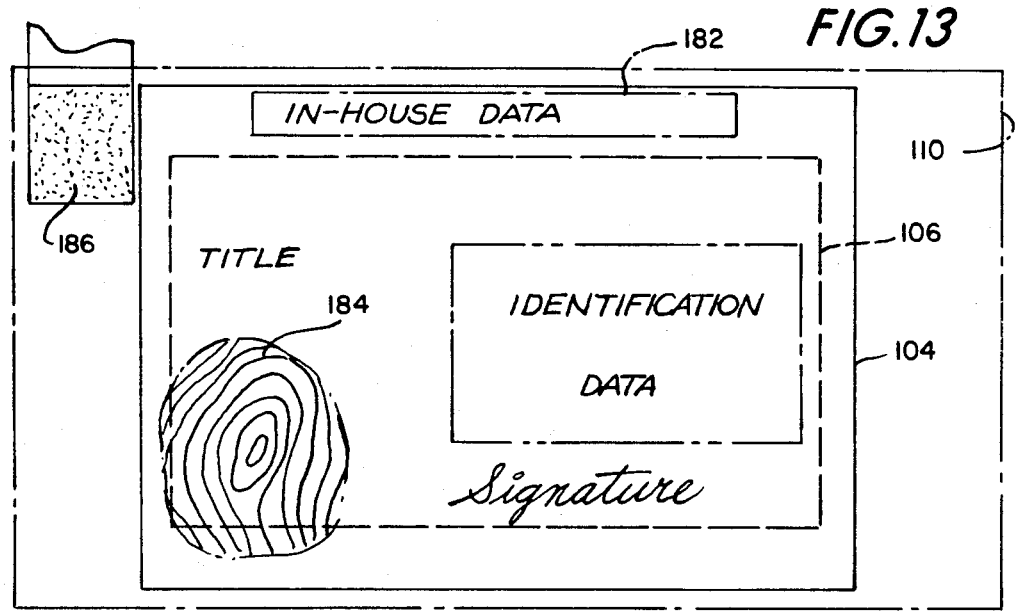
FIG. 13 is a plan view of a data carrier employed in the invention.
Figure 14:
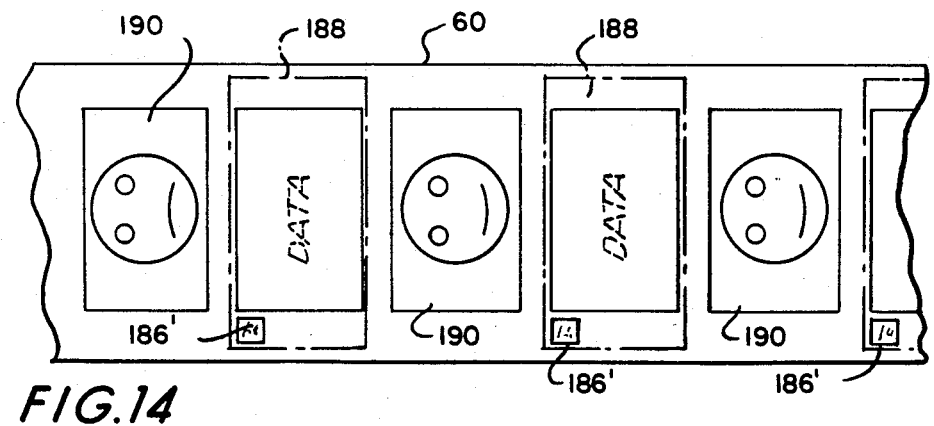
FIG. 14 is a fragmentary plan view illustrating a section of record film provided by the system of the present invention.

The data carrier or card 104 used with the present invention is illustrated in FIG. 13 to include the identification data and signature to be received on the card 166. This data on the card 104, referred to herein as "card data", will lie within the field of view of the ID camera back 38 as represented in FIG. 13 by the dashed line 106. In addition to the information to be received on the identification card 166, the data card 104 preferably includes an area 182 for "in-house data". Such data may be typed or otherwise provided on the data card 104 but is intended for administrative purposes only and not to be included on the identification card 166. To this end, the area 182 lies outside the field 106 of the ID camera back 38. Also on the data card 104 is a fingerprint 184 of the subject to whom the data card 166 is to be issued. The fingerprint is located in an area masked from reproduction on the identification card 166 by the polarizer plate 174 as reserved for the portrait 172 of the subject. Finally, a film record blip tab 186, which can be used for indexing the microfilm record, is positioned to one side of the card 104 but within the field 110 of the record camera 54. All such data presented to the record camera 54 is referred to herein as "card data" and, as such, includes the previously described "record data".

In the operation of the system, the recording of each identification card will involve two consecutive frames on the filmstrip 60 in the record camera 54. In other words, the full quantum of record data falling within the field 110 in FIG. 13 is duplicated on alternate frames 188 of the filmstrip 60 with intermediate frames 190 reserved for a portrait of the subject. The presence of a blip 186' between portrait and data frames serves to identify the information relevant to a single identification card 166.

Figure 15:
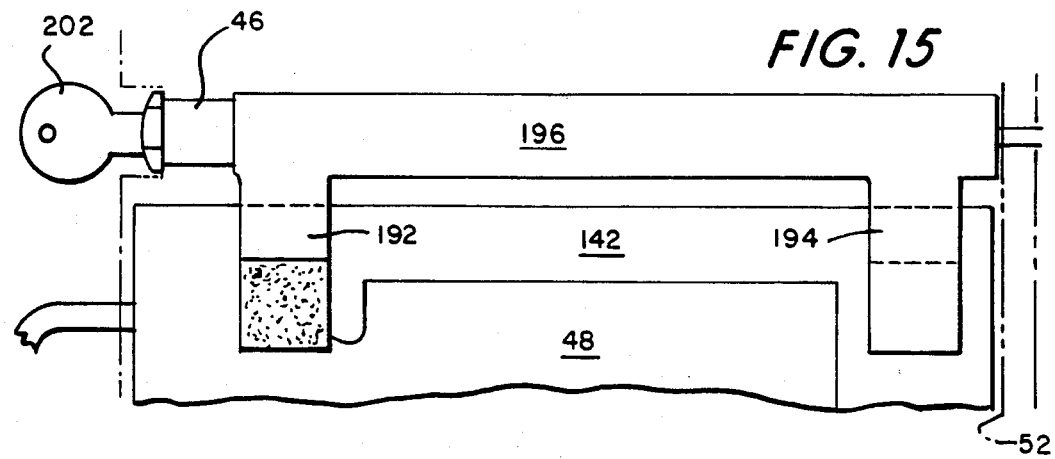
FIG. 15 is a fragmentary plan view illustrating a portion of the apparatus shown in FIG. 7 in one condition of operation.
Figure 16:
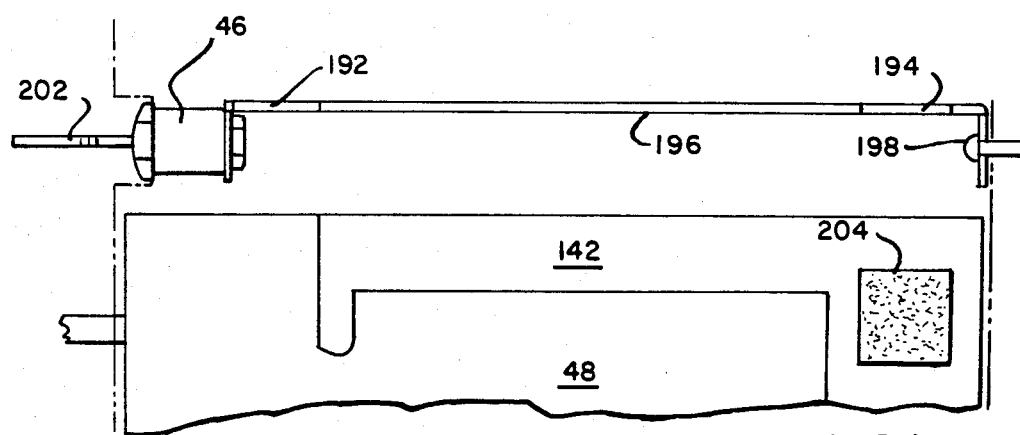
FIG. 16 is a similar fragmentary plan view but illustrating the components shown in FIG. 15 in a different operative position.

The blip tab 186 which results in the blip 186' adjacent one side of each of the frames 188 on the record filmstrip 60 is provided by an apparatus incorporated in the system of the invention principally for purposes of security and indexing. As shown in FIGS. 7, 15, and 16 of the drawings, the blip tab 186 is represented by a stippled area on one of two tabs 192 and 194 projecting from a base 196 extending between the front and rear chassis walls 52 and 148, respectively. The base 196 is pivoted in the front chassis wall 52 by a pintel 198 and is secured for rotation with keyed components of the lock 46 secured in the rear chassis wall 148. A key 202 for the lock 46 is presented at the rear of the housing 10 adjacent the opening for the tray 48 as may be seen in FIGS. 2, 7, 15, and 16.

By manipulation of the key 202, the tabs 192 and 194 may be positioned in either of the two positions illustrated in FIGS. 15 and 16 of the drawings. Thus, in FIG. 15 of the drawings, the tabs 192 and 194 are located over the top of the data tray 48, whereas in FIG. 15, the tabs are pivoted to a vertical position displaced from the tray 48. The tray cap 142 is provided with a stippled area 204 which underlies the tab 194 when the tabs are pivoted to the down position shown in FIG. 15 and with the data tray in its inward and operative position. Thus, the stippled area 204 will be presented to the film plane 64 of the record camera when the tabs are displaced from the tray 48 and will be covered by the tab 194 when the blip area 186 overlies the tray 48.

The system of the invention is initialized by supervisory personnel having in his possession the key 202 and a supervisory data card (not shown). To so initialize the system, the supervisory person inserts the key 202 into the lock 46, turns the tabs 192 to their displaced position as shown in FIG. 16, inserts a supervisory data card into the tray 48 and pushes the tray inward to execute a microprocessor controlled sequence, described more fully below, that exposes a frame 205 on the record filmstrip 60 to the supervisory data card. The supervisory data card may include such information as identification of the supervisory person, the location of the system as well as other such information as the date of operation and the like. After the frame 205 on the record filmstrip 60 is exposed, the key 202 is turned to position the tabs 192 and 194 in the position shown in FIG. 15. The key 202 is withdrawn from the lock 46 and the system is now initialized or ready for a period of operation by regular operators.

After operation to provide the record strip 60 with alternate data and portrait frames 188 and 190 as described above with reference to FIG. 14, each pair of data and portrait frames having a blip 186' on one side of the filmstrip 60, the supervisor personnel closes out a day or other selected period of operation by again inserting his or her supervisory data card into the tray 48 and exposing a closing frame 206 on the record filmstrip 60. Both the initializing frame 205 and the closing frame 206 will be provided with a blip 208 located on the opposite side of the filmstrip 60 from the identification card blips 186'. As a result of the initialization sequence, therefore, a complete record of use of the identification camera system is provided as well as an indication of participation by select supervisory personnel.

A significant further measure of security is provided in the overall system of the present invention as a result of microprocessor controlled operation initiated by minimal action on the part of the operator. To facilitate an understanding of the automated operation, the following table identifies the various switches, status, and function sensors incorporated in the system and the function performed by each switch or sensor.

| | INDEX OF SWITCHES |
|---|---|
| S-P | Main power switch |
| S-1 | System lock-initialized/not initialized |
| S-2 | Data carrier tray 48-closed/open |
| S-3 | Card 104-present/not present |
| S-4 | First moveable mirror 66-operative/displaced |
| S-5 | ID mirror 70-in position/not in position |
| S-6 | Filmpack present/not present |
| S-7 | Film back 38-up/down |
| S-8 | Film pulled/not pulled |
| S-9 | Film door 43 closed (microfilm) |
| S-10 | Third moveable mirror 102-in position/not in position |
| S-11 | Exposure light at record film plane 64-adequate/not adequate |
| S-12 | Record film supply adequate/low |
| S-13 | Record film motion detect (wind/no wind) |
| S-14 | Portrait button 50-actuated/not actuated |
| S-15 | Validation plate 174 pulled in/released |
| S-16 | Interrupts power when aim light door 34 is open |
| S-17 | Controls circuitry (not monitored by microprocessor) to illuminate aim lamp 32 |

While several of the switches or sensors, such as S-2 and S-3, have been identified previously and are in the nature of electromechanical switches, others may be in the nature of logic level detectors, photodetectors, or other purely electronic switching or sensing devices.

Also, switches such as the power switch S-P and portrait button 50 switch S-14 are manually activated switches. The record film motion detector S-13, which assists in determining if the record film winds in response to an appropriate command, can take the form of a disc with alternate light and dark sectors which is attached to the record film supply reel. A light-emitting diode directs its output to the disc with the reflected light directed to a photogransistor. Record film motion is detected by changes in the output level of the phototransistor caused by rotation of the disc.

Operation of the various moveable components involve motors including pulse-driven stepping motors and solenoids, or the like, by which the connected optical and mechanical components are moved on signals generated originally by the above-described switch, status, and function detectors and processed through the below-described control system. Thus, the following table provides a listing of motors and functions performed by each motor.

| INDEX OF MOTORS | |
|---|---|
| M-1 | Moves first moveable mirror 66 |
| M-2 | Moves second moveable mirror 70 |
| M-3 | Moves third moveable mirror 102 |
| M-4 | Activates ID camera shutter - data path |
| M-4.5 | Activates ID camera shutter - portrait path |
| M-5 | Activates record camera shutter |
| M-6 | Activates record camera film advance |
| M-7 | Activates validation plate |

From the index of motors it will be appreciated that each of the identified components may be actuated between the positions previously mentioned.

Figure 18:
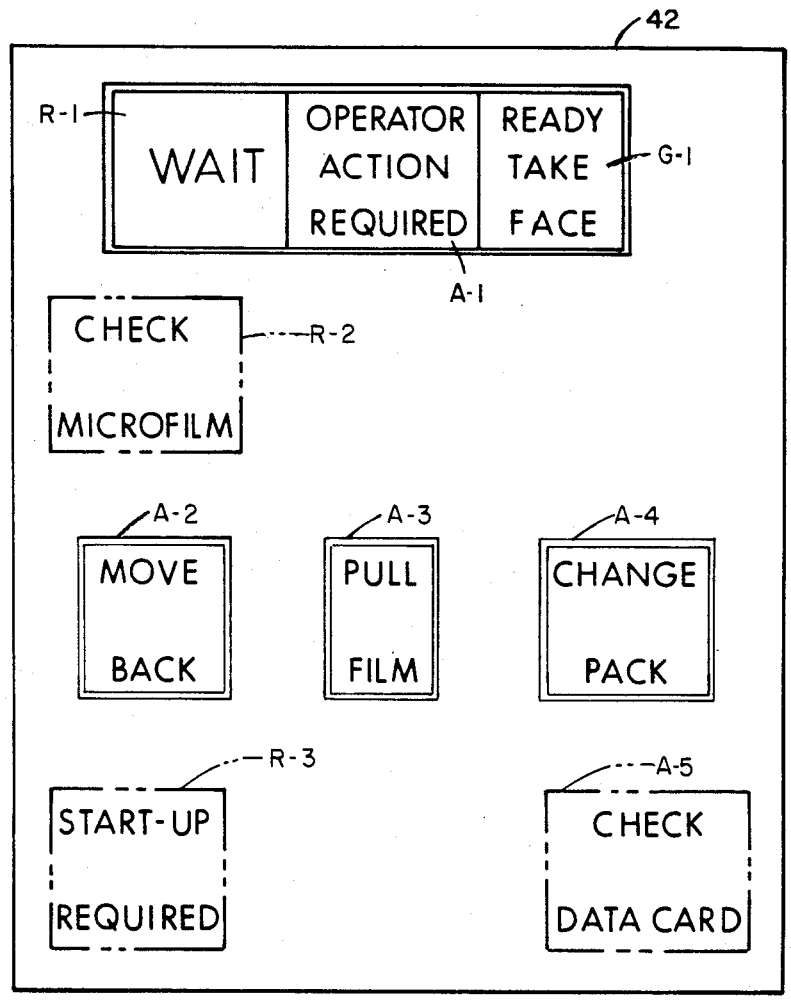
FIG. 18 is an enlarged elevation of a lamp bezel presented on the rear exterior housing of the invention.

In FIG. 18 of the drawings, the lamp bezel 42 on the back of the housing 10, previously described with reference to FIG. 2, is shown in substantially greater detail. Each of the legends provided on the bezel 42 is situated to cover an illuminatable light source, such as a lamp or an LED (not shown), but which may be designated both by reference to the information provided by the illumination of such lamp and by color of each lamp. With respect to color, red lamps are used for the legends "WAIT", "CHECK MICROFILM", and "START-UP REQUIRED" and, as such, are designated R-1, R-2, and R-3, respectively, in FIG. 18 (and in FIG. 19). A green lamp G-1 illuminates the "READY TAKE FACE" legend on the bezel 42 and may be operated in a steady mode when the system is ready for operation, in general, or in a flashing mode when the operator is instructed to depress the portrait button 50. All other legends on the bezel 42 are illuminated by amber lights designated A-1, A-2, A-3, A-4 and A-5, respectively.

Figure 19A:
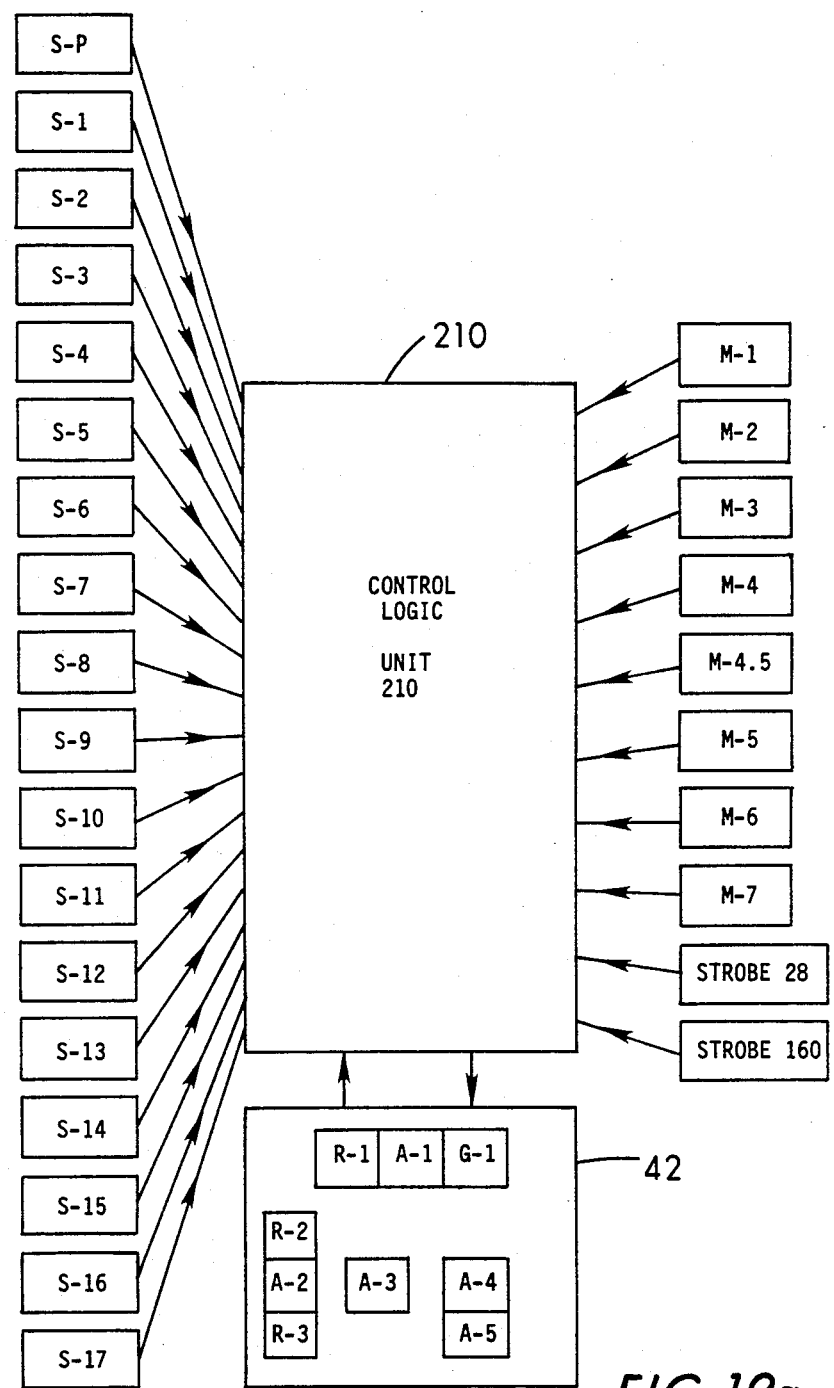
FIG. 19A is a schematic block diagram showing the relationship between a control logic unit and various sensing switches and controlled devices and the lamp bezel of FIG. 18.

In FIG. 19A of the drawings, the overall control system organization is illustrated in which a control logic unit 210 operates in response to signal indications from the various switches and sensors indicated to either actuate the motors M-1 through M-7 or to illuminate the bezel 42 lamps identified above with respect to FIG. 18. In addition, the control logic unit 210 will actuate the respective strobe lamps 28 and 160.

Figure 19B:
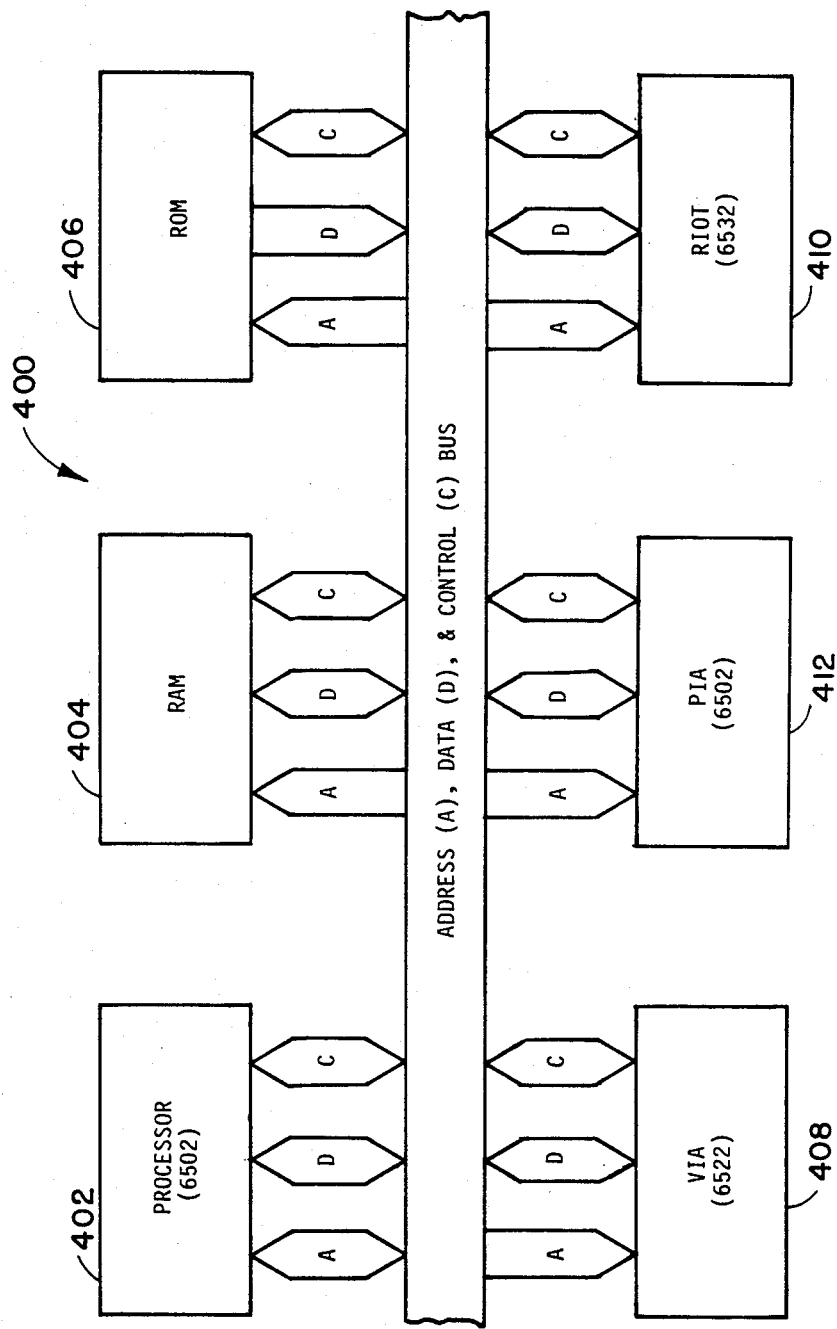
FIG. 19B is a schematic block diagram of a stored-program controlled microprocessor-based controller utilized with the control logic unit of FIG. 19A.

FIG. 19B illustrates the overall architecture of a microprocessor-based controller 400 of the control logic unit 210 of FIG. 19A. The controller 400 is preferably in the form of a single-board computer and includes a microprocessor 402, a random-access memory 404 (RAM), a read-only memory 406 (ROM), one or more peripheral interface adaptors 408 (VIA), and one or more multi-function support logic devices 410 (RIOT) and 412 (PIA). The various devices are connected by a common bus 414 that accommodates the address, data, and control signals as is known in the art. One microprocessor and related chip set suitable for the controller 400 is the 6502 processor manufactured by the Commodore Semiconductor Group (MOS Technology) of Norristown, Pa. 19401. Related chips specifically intended for use with the 6502 processor include the 6522 VIA, 6532 RIOT and 6520 PIA. Further details as to the 6502 chip set can be found in Osborne, A., *Microcomputers* V. 11, 1977.

The processor 402 operates in accordance with object code instructions stored in the ROM 406 with intermediate arithmetic, logic, and data information temporarily stored in the RAM 404 or working registers in the VIA 408. Interfacing with the various switches, sensors, motors, actuators, and lamps described above is accomplished through the VIA 408 as supported by the RIOT 410. Depending upon the type of device controlled and the PIA 412, for example, a stepping motor, a solenoid, or a strobe, various device drivers may be provided between the output port of the VIA 408 and the driven device, as is known in the art. In addition, various status and flag registers and software timers are defined among the available RAM locations. One preferred single-board computer that utilizes the above-described 6502 processor and related chips in a controller application is the model 6500 manufactured by Cubit, Inc.

Figure 20A:
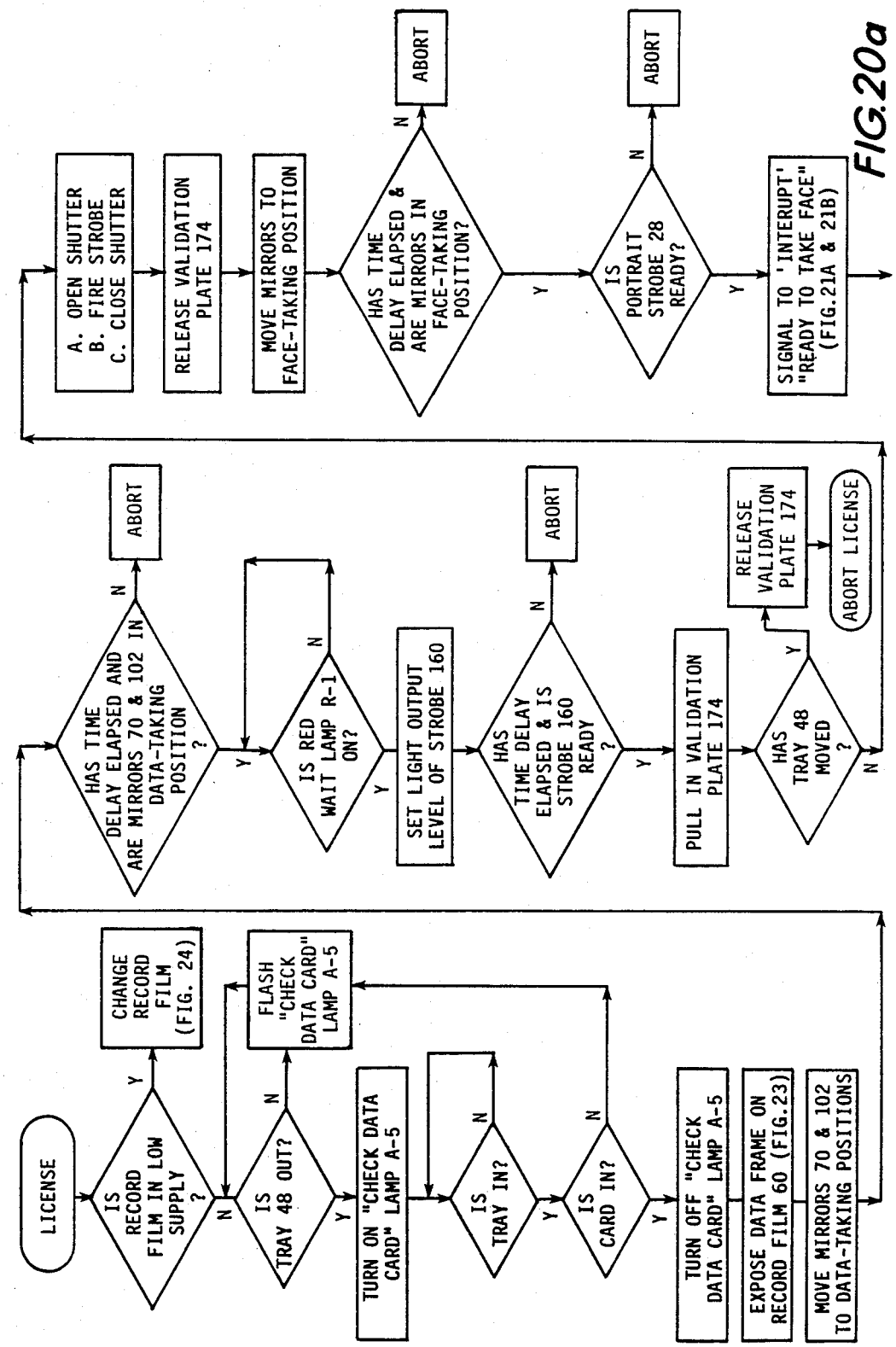
FIGS. 20A and 20B represent a flow diagram of the primary instruction sequence for controlling the camera to produce an identification card, such as a driver's licence.
Figure 20B:
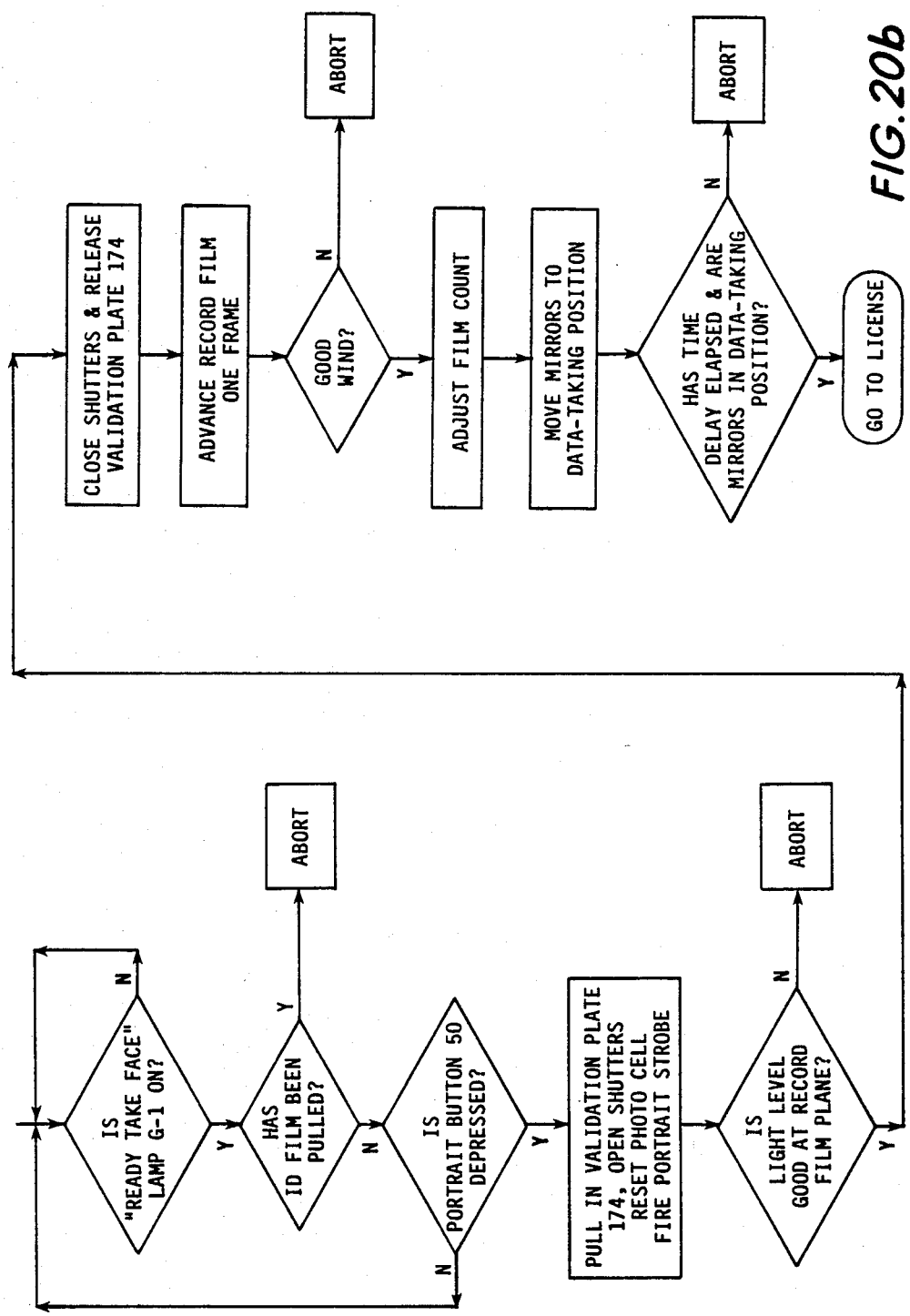
Figure 21B:
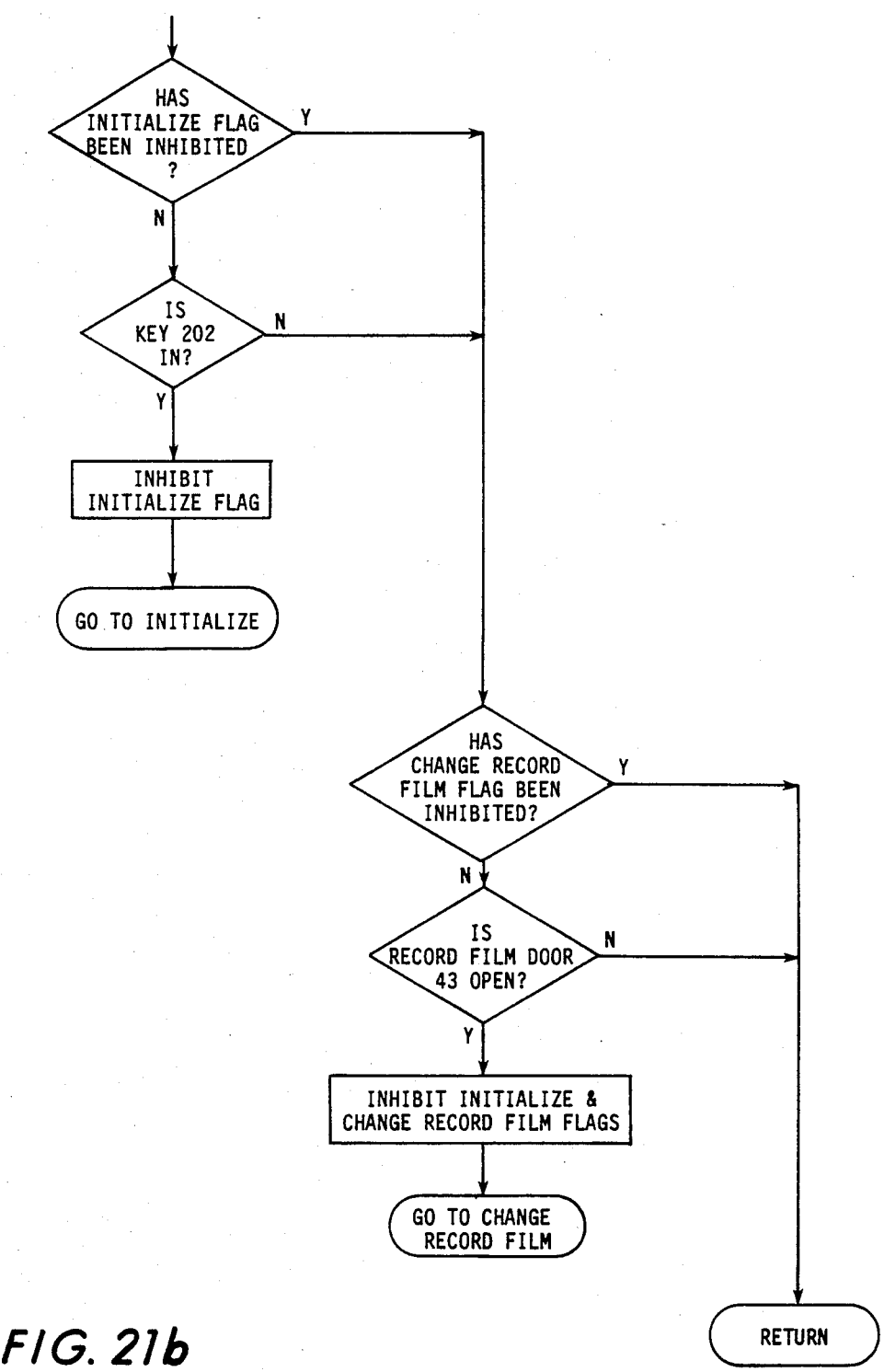

The flow diagram of FIGS. 20A and 20B, labeled "LICENSE", represents the primary or main instruction sequence for producing an identification card, such as a driver's license, while the flow diagram of FIGS. 21A and 21B, labeled "INTERRUPT", represent a periodically entered monitoring sequence for monitoring the camera status and detecting unexpected changes in camera status.

The primary "LICENSE" sequence can conditionally branch to a sub-program (FIG. 24), labeled "CHANGE RECORD FILM", to to supervise the changing of the record film 60 and also can branch to another sub-program (FIG. 23), labeled "EXPOSE RECORD FILM", to supervise the exposure of the record film frames. In addition, the primary "LICENSE" sequence, under control of a 50 ms. system timer, is required to unconditionally enter the above-mentioned "INTERRUPT" monitoring sequence (FIGS. 21A and 21B) to monitor the operational states and status of the various switches, sensors, and controlled devices in the camera.

Figure 17:
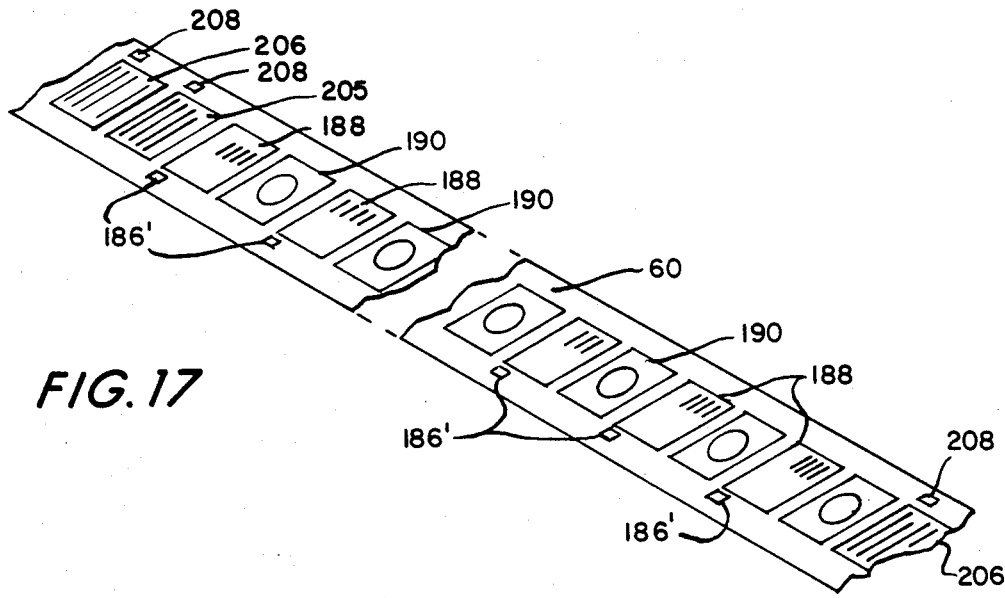
FIG. 17 is a fragmentary perspective view illustrating a record strip resulting from a complete cycle of operation.

The "INITIALIZE" sequence (FIG. 22) must be performed by the supervisor using his key 202 to cause one frame of the record film 60 to be exposed to the supervisor's data card and to place the blip 208 on the record film 60 margin, as shown in FIG. 17. The "INITIALIZE" sequence is typically performed at the beginning and end of the production of a series of identification cards, such as at the beginning and end of a business day or week.

As explained in further detail below, a number of conditional queries are executed in the various instruction sequences with the instruction sequence conditionally exiting to an "ABORT" by which various sensor and control flags and control bits are set or reset to cause the camera to enter a safe shut-down, that is, with no power being supplied to any of the motors or other power-driven devices, the shutters in their closed positions, and triggerable devices, such as the strobes 28 and 160, in their untriggered status.

The use of a timer-controlled interrupt and the conditional abort queries provides substantial protection against any attempted tampering during the production of a data card, since the instruction sequence will exit to a controlled abort.

Prior to performing the main instruction sequence set forth in FIGS. 20A and 20B, it is part of the operating sequence of the identification camera system for a supervisor to initialize the camera, as explained above. The supervisor initiation sequence is set forth in FIG. 22 and, as shown therein, this sequence begins by first determining if the record film supply is satisfactory and, if not, the program enters a change record film sequence presented in FIG. 24, as described below. Where the record film supply is adequate, the various inputs/outputs (I/O) are reset. The I/O's are reset by placing appropriate control bits in various registers and flag locations so that the camera is in a safe shut-down condition, that is, with the motors and other power-driven devices in an unpowered states, triggerable devices, such as the strobes 28 and 160, in an untriggered state and the shutters in their 'closed' state. A query is then performed to determine if the film has been exposed. If the film has been exposed, the identification film back 38 (FIG. 2) is adjusted to present a unexposed film area or the exposed film unit is removed to present a unexposed film unit. If the identification film has not been exposed or an unexposed film unit has been positioned properly, the mirrors 70 and 102 (FIG. 4) are moved to their respective data-taking positions. After the expiration of a time-delay period, the respective positions of the mirrors 70 and 102 are checked and if they have not attained their data-taking positions, the instruction sequence terminates through an abort. The time-delay wait can be accomplished through a software timer or, preferably, by counting the pulses to stepping motors M-2 and M-3 that drive the mirrors 70 and 102. After the mirrors have been positioned, the "START-UP REQUIRED" lamp (R-3, FIG. 18) is illuminated. A check is then performed to determine if the supervisor's key 202 (FIG. 7) is inserted into the key-receiving lock 46. If the key 202 is in position, the identification card counter is reset to zero, and a number of checks performed to determine if the data card tray 48 is 'out' and, if so, the "CHECK DATA CARD" lamp (A-5, FIG. 18) is illuminated. Thereafter, a check is performed to determine if the tray 48 is in its 'in' position. At this point, the supervisor inserts the supervisor data card into the tray 48. Thereafter, a check is performed to determine if the supervisor's data card 104 is in the tray 48. If the tray 48 is not in its 'in' position or if the data card 104 is not in the tray 48, the instruction sequence flashes the "CHECK DATA CARD" lamp (A-5, FIG. 18) with the instruction sequence remaining in this loop until such time that the tray 48 is placed in its 'in' position with a data card 104 in the tray. After determining that the tray 48 is in its 'in' position and that the data card 104 is in place, the "CHECK DATA CARD" lamp (A-5, FIG. 18) is turned off and the record film frame is exposed. The record film 60 exposure step is explained in greater detail below with regard to the flow diagram of FIG. 23. After the record film 60 is exposed to the supervisor's data card 104, a check is performed to determine if the tray 48 has been moved to its 'out' position and, if not, the "CHECK DATA CARD" lamp (A-5, FIG. 18) is caused to flash. If the tray 48 has been moved to its 'out' position, a buzzer or other audio signaling device is sounded and the "START-UP REQUIRED" lamp (R-3, FIG. 18) is caused to flash intermittently to remind the supervisor to remove the supervisor data card 104 and the key 202. A check is then performed to determine if the supervisor's key 202 has been removed from the key-receiving lock 46. If the key 202 has not been removed, the instruction sequence loops about this check. If the key 202 has been removed, the "START-UP REQUIRED" lamp (A-5, FIG. 18) is turned off and re-enabled. After the conclusion of the supervisor's initiation sequence of FIG. 22, the supervisor's data card and the associated information blip 208 have been exposed to one frame of the recording film 60. The identification camera is then ready for the license producing procedure of FIGS. 20A and 20B.

Figure 22:
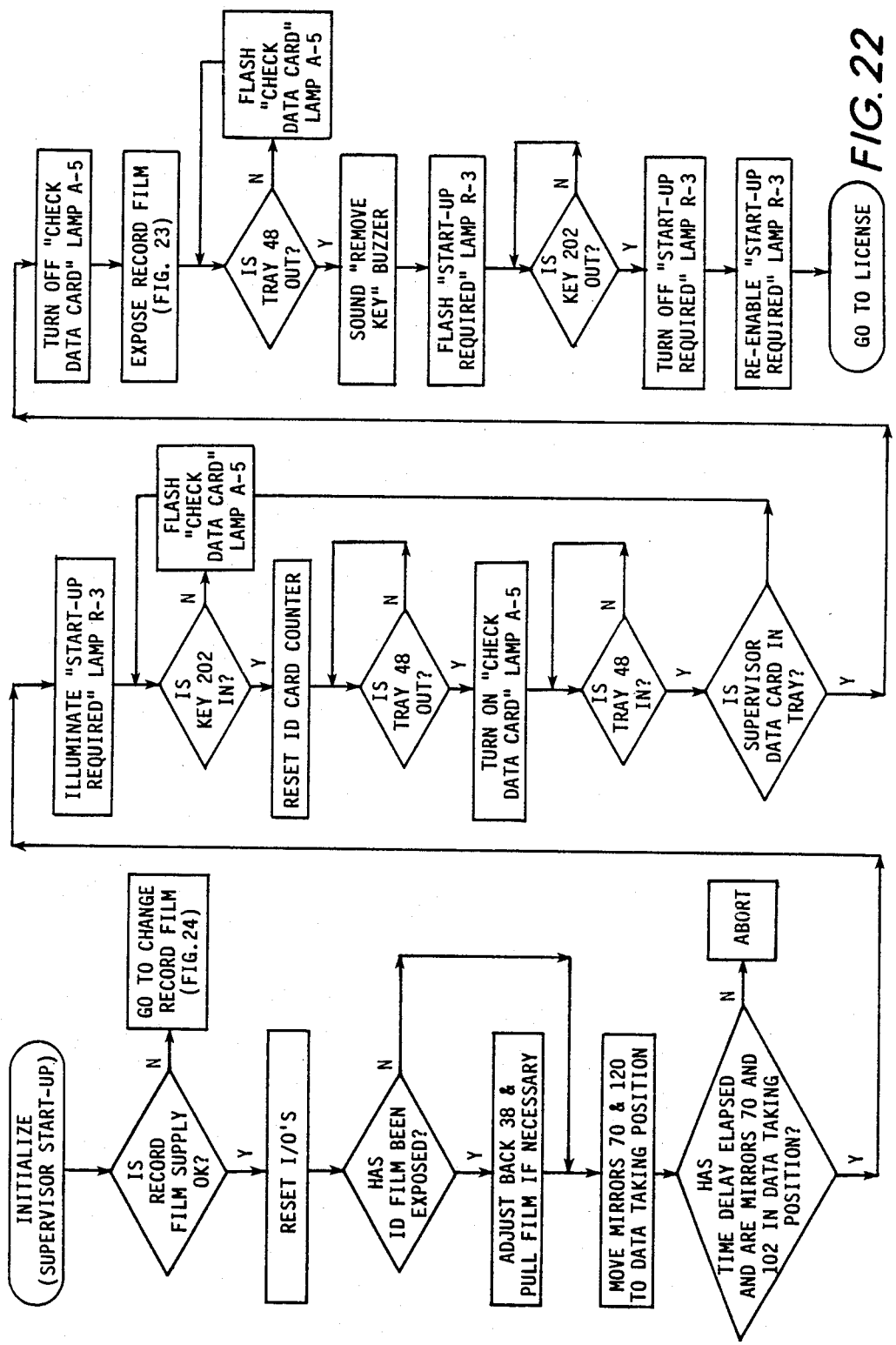
FIG. 22 is a flow diagram illustrating an "Initialize" instruction sequence for initializing the camera.

In the above-described supervisor initiation sequence summarized by the flow diagram of FIG. 22, two additional programs can be entered, the "CHANGE RECORD FILM" program for changing the record film 60 and the "EXPOSE RECORD FILM" program for exposing successive frames of the record film.

Figure 24:
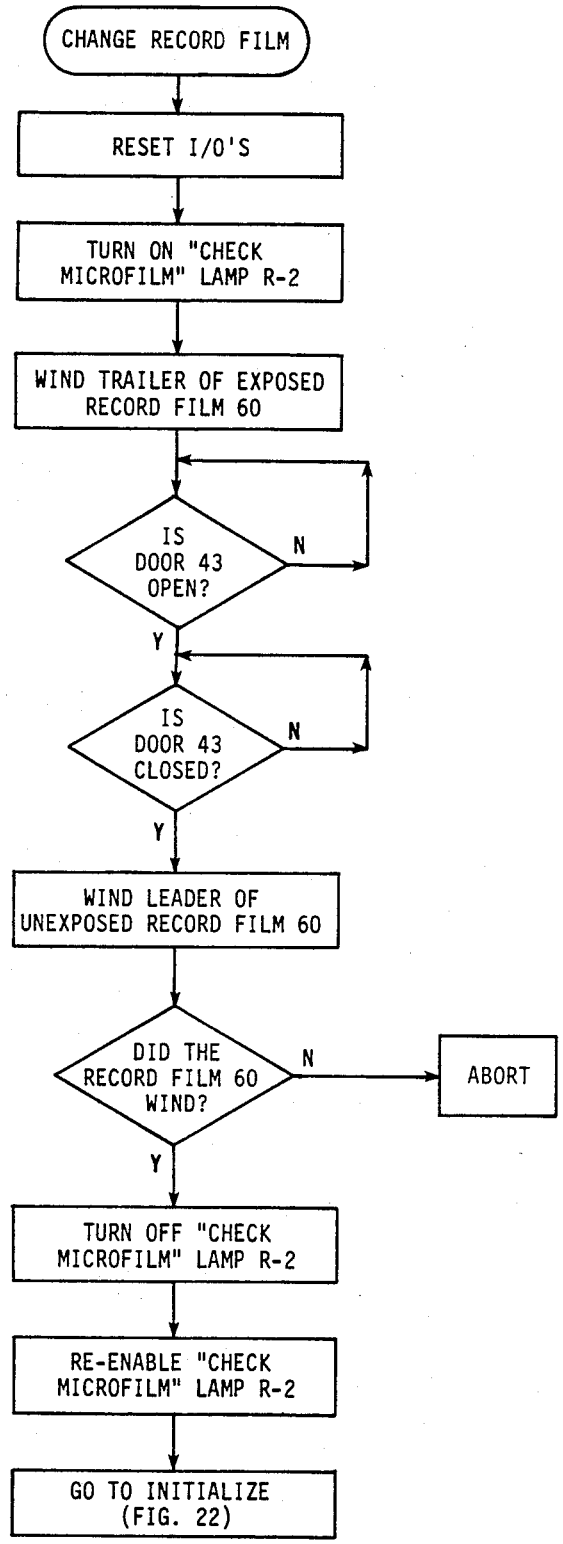
FIG. 24 is a flow diagram illustrating a "Change Record Film" instruction sequence for effecting a change in the record film.

The program for changing the record film is illustrated in FIG. 24 and, as shown therein, includes the initial steps of resetting the input/outputs (I/O) and illuminating the "CHECK MICROFILM" lamp (R-2, FIG. 18). The I/O's are reset by placing appropriate control bits in various registers and flag locations so that the camera is in a safe shut-down condition, that is, with the motors and other power-driven devices in an unpowered state, triggerable devices, such as the strobes 28 and 160, in an untriggered state, and the shutters in their 'closed' state. The leader of the exposed record film 60 is then wound unconditionally (25–40 frames) so that the exposed frames will not be fogged when the record camera door 43 (FIG. 2) is subsequently opened. A query is then performed to determine if the door 43 is in its 'open' position and, if not, the instruction sequence loops about this query. If the door 43 is open, a query is then performed to determine if the door is in its 'closed' position. Between the opening and closing of the door 43, the camera operator installs a fresh supply of unexposed record film 60. The leader of the unexposed record film 60 is then wound unconditionally (e.g., 10 frames) and a query then performed to determine if the unexposed record film 60 has wound and, if not, the program exits through the abort sequence. If the record film 60 was wound successfully, the "CHECK MICROFILM" lamp (R-2, FIG. 18) is turned off and re-enabled to conclude the change record film program.

Figure 23:
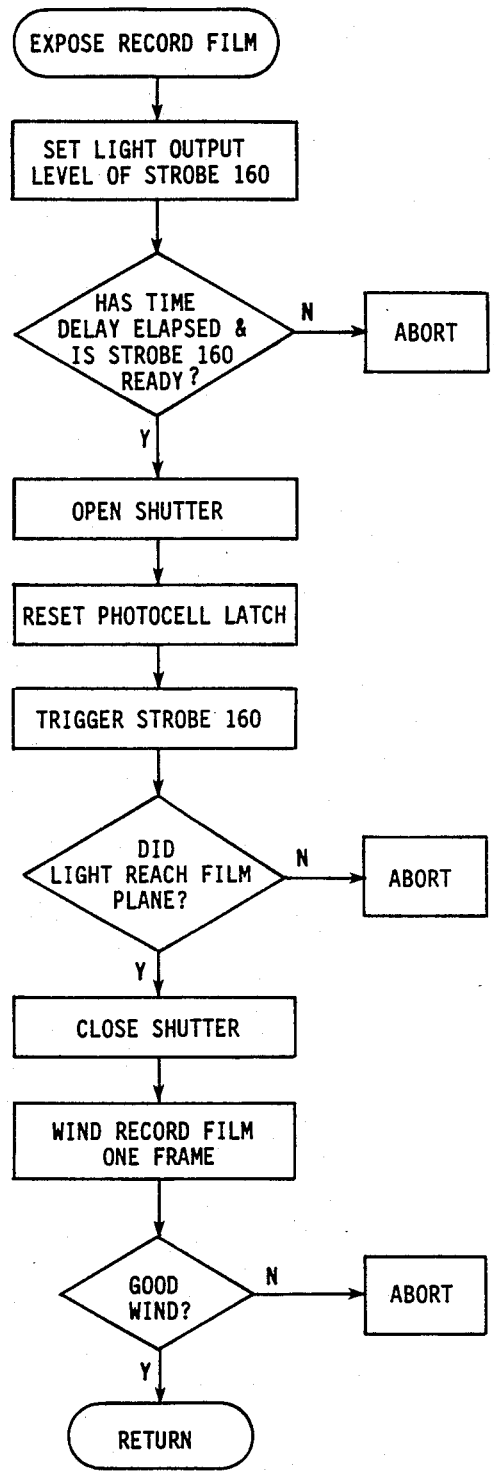
FIG. 23 is a flow diagram illustrating an "Expose Record Film" instruction sequence for exposing the record film.

Exposure of the record film frames in the above-described supervisor initiation process of FIG. 22, as well as in the below-described primary "LICENSE" sequence of FIGS. 20A and 20B, is controlled by the "EXPOSE RECORD FILM" program illustrated in FIG. 23. As shown therein, the light output level of the strobe 160, located just above the data card 104 (FIG. 10), is set. The strobe 160 can be selectively set to one of two light output levels, a first level for exposing the frames of the record film 60 and another for the ID film. A time delay (e.g., 12 sec.) is allowed to elapse to permit the strobe to charge and a query performed to determine if the strobe 160 is in its ready state and, if not, the instruction sequence terminates. When the strobe 160 is in its ready condition, the shutter is opened, the recording film photocell latch is reset, and the strobe 160 triggered. The photocell latch has two states, a reset state to indicate the absence of light at the record film plane and a set state to indicate the presence of light above a selected threshhold level. A query is then performed to determine if the recording film photocell latch changed to its set state, that is, to indicate that light from the strobe 160 had reached the recording film plane. If the photocell latch does not switch to the set state, indicating that the strobe 160 light has not reached the recording film plane, the instruction sequence is terminated. Where the light output of the strobe 160 reaches the record film plane, the shutter is instructed to close and a command issued to wind the record film 60 one frame. After the record film wind command is issued, a query is performed to determined if the record film 60 wound properly and, if not, the instruction sequence terminates. If a good wind is performed, then the exposed record film sub-routine program returns to the calling program.

The procedure for producing an identification card, such as a driver's license, is presented in the primary or main instruction sequence of FIGS. 20A and 20B. After the instruction sequence is started, a query is performed to determine if the record film 60 is in low supply, and, if so, the above-described "CHANGE RECORD FILM" program of FIG. 24 is invoked to supervise the changing of the record film. If the record film 60 supply is adequate, a query is performed to determine if the data card tray 48 is in its 'out' position and, if not, the "CHECK DATA CARD" lamp (A-5, FIG. 18) is caused to flash. If the data card tray 48 is in its 'out' position, the "CHECK DATA CARD" lamp (A-5, FIG. 18) is turned on. At this point, the camera operator inserts the data card 104 containing subject-related data into the data card tray 48. A query is then performed to determine if the data card tray 48 is in its 'in' position. If the tray is not in its 'in' position, the instruction sequence loops about this query. When the data card tray 48 is moved to its 'in' position, a query is then performed to determine if the data card 104 is in the tray 48 and, if not, the "CHECK DATA CARD" lamp (A-5, FIG. 18) is caused to flash intermittently with the instruction sequence looping about this checking sequence. Where the data card 104 is in the tray 48, the "CHECK DATA CARD" lamp (A-5, FIG. 18) is turned off and the image of the data card 104 is exposed to one frame of the record film 60 by calling the "EXPOSE RECORD FILM" program of FIG. 23 as described above. After the image of the data card has been exposed to one frame of the record film 60, the mirrors 70 and 102 are moved to their data-taking positions. After a selected period of time has elapsed to allow the mirrors to reposition, a query is then performed to determine if the mirrors 70 and 102 are in their data-taking positions and, if not, the instruction sequence terminates. The time period can be determined from a software timer, or, more preferably, by counting the number of pulses supplied to the stepping motors M-2 and M-3 that drive the mirrors. If the mirrors 70 and 102 have moved successfully to their respective data-taking positions, a query is performed to determine if the red "WAIT" indicator lamp R-1 is illuminated and, if illuminated, the program loops about this query. If the "WAIT" indicator lamp is not illuminated, the instruction sequence proceeds to set the light output level of the strobe 160. After the strobe level set command is issued, a time delay (e.g., 12 sec.) is allowed to elapse and a query is performed to determine if the strobe 160 is in its 'ready' state and, if not, the instruction sequence terminates. If the strobe 160 is in its 'ready' state, a command is issued to pull-in the validation plate 174 and a query is performed to determine if the tray 48 has been moved. If the tray 48 has been moved, a command is issued to release the validation plate 174 and the instruction sequence terminates. The checking of the tray 48 position at this point in the instruction sequence provides an added measure of security against the switching of the data card 104 or otherwise tampering with the production of identification cards or licenses. If the tray 48 has not been moved, command signals are issued to expose the identification film to the data card by opening the shutter, triggering the strobe 160, and closing the shutter to effect exposure. Commands are then issued to release the validation plate 174 and move the mirrors 70 and 102 to their respective portrait-taking positions. After a selected period of time has elapsed to allow the mirrors 70 and 102 to reposition, a query is performed to determine if the mirrors are in their portrait-taking positions, and, if not, the instruction sequence aborts.

After the mirrors 70 and 102 move to their portrait-taking positions, a query is performed to determine if the portrait strobe 28 (FIG. 1) is ready and, if not, the instruction sequence terminates. When the portrait strobe 28 is ready, a signal is issued to the below-described "INTERRUPT" program (FIGS. 21A and 21B) to indicate that the camera is ready to take the portrait. After the command to the "INTERRUPT" program is issued, a query is performed to determine if the green light lamp "READY TAKE FACE" (G-1, FIG. 18), is on and, if not, the program loops about this query. Where the lamp G-1 is on, a query is performed to determine if the identification film has been pulled and, if it has been pulled, then the instruction sequence terminates. If the identification film has not been pulled, a query is performed to determine if the portrait button 50 (FIG. 2) has been depressed and, if not, the instruction sequence loops about this query. When the portrait button 50 is depressed, a command is issued to pull-in the validation plate 174, open the record film shutter and the ID camera portrait shutter, reset the photocell at the record film plane, and trigger the portrait strobe 28. The light from the strobe 28 that is reflected from the subject enters the camera through the record film objective lens 26 to expose the record film frame and through the identification film objective lens 24 to expose the identification film. A query is then made to determine if the light level at the record film plane is sufficient by checking the status of the photocell latch, as described above, and, if the light level is not sufficient, the instruction sequence terminates. Where the light level at the record film plane is sufficient, the shutters are closed and the validation plate 174 is released. Thereafter, the record film 60 is advanced one frame and a query performed to determine if there has been a successful one-frame wind and, if not, the instruction sequence terminates. Where the record film wind is determined as good, the record film frame count is incremented and the mirrors 70 and 102 are moved to their data-taking positions. After an appropriate waiting period has elapsed, a query is then performed to determine if the mirrors 70 and 102 are in their data-taking positions and, if not, the instruction sequence terminates. Where the mirrors 70 and 102 are successfully repositioned to their data-taking positions, the instruction sequence returns to its initial state.

The license-producing program presented in the flow diagrams of FIGS. 20A and 20B, described above, is interrupted each 50 ms. to run the instruction sequence "INTERRUPT" of FIGS. 21A and 21B, which queries the positional states or operational status of the various sensors, switches, and devices of the camera and updates various registers, flags, and timers with update information that is read and utilized by the license-producing program.

As shown in FIG. 21A, various timers associated with the development of the exposed self-developing film units are updated and a query performed to determine if any additional timer start switches (not shown) have been actuated. A timer start switch is pressed by the camera operator each time a self-developing film unit is pulled from the camera to start a 60 second timer and illuminate a red indicator lamp (not shown). The "INTERRUPT" program updates the development-time information to indicate when the film unit self-development process has ended. If no self-developing timer switches have been actuated, the instruction sequence then determines if the data tray 48 is in its 'out' position and, if so, the "CHECK DATA CARD" lamp (A-5, FIG. 18) is set. The instruction sequence then proceeds to determine if the identification film back 38 (FIG. 2) is in its proper position and, if not, the "MOVE BACK" lamp (A-2, FIG. 18) is illuminated. As described-above, the ID film back 38 is movable between two positions. A counter is associated with the exposure of the ID film units and the odd/even state of the counter is compared with the alternate positions of the camera back 38 to determine if the film back is in proper position. A query is then performed to determine if a film pack containing a film unit is in the film back 38 and, if not, the "CHANGE PACK" lamp (A-4, FIG. 18) is illuminated. If the film pack is in the film back 38, a query is made to determine if a film pack has been inserted and, if so, the "PULL FILM" (A-3, FIG. 18) lamp is illuminated to request pulling of the dark slide. Thereafter, the identification film counter is initialized and the "PULL FILM" and "CHANGE PACK" lamps (A-3,A-4, FIG. 18) are turned off. After the sequence which establishes the ready condition of the film pack as described above has been accomplished, a query is performed to determine if the record film motion detector sensor S-13 has changed status and, if so, the "good" wind status is set. A query is then performed to determine if the film pack is out of the filmback 38 and, if not, a query is then performed to determine if the pull sequence has been started and, if not, another query is performed to determine if a pull was started and, if so, the "PULL FILM" lamp (A-3, FIG. 18) is turned off and the various amber lamps are then extinguished. If there are any amber lamps on, the "OPERATOR ACTION REQUIRED" lamp (A-1, FIG. 18) is turned on. If no amber lamps are on, a query is performed to determine if the identification camera is ready to shoot and, if so, the "READY TAKE FACE" lamp (G-1, FIG. 18) is turned on, and, if not, the "WAIT" lamp (R-1, FIG. 18) is turned on. A query is then performed to determine if the initialize flag has been inhibited (which inhibit occurs whenever the camera is in the "INITIALIZE" sequence of FIG. 22), and, if not, a query performed to determine if the supervisor key 202 is in position and, if so, the inhibit is initialized. If the initialize flag was not inhibited, the instruction sequence proceeds to query whether or not the change record film has been inhibited (which occurs whenever the camera is in the "CHANGE RECORD FILM" sequence of FIG. 24) and, if not, a query is performed to determine if the record film door 43 (FIG. 2) has been opened and, if so, the initialize and change record film procedure is inhibited with the instruction sequence branching to the "CHANGE RECORD FILM" program of FIG. 24. If the change record film flag has not been set, the program returns to the primary instruction sequence of FIGS. 20A and 21A.

Figure 25:
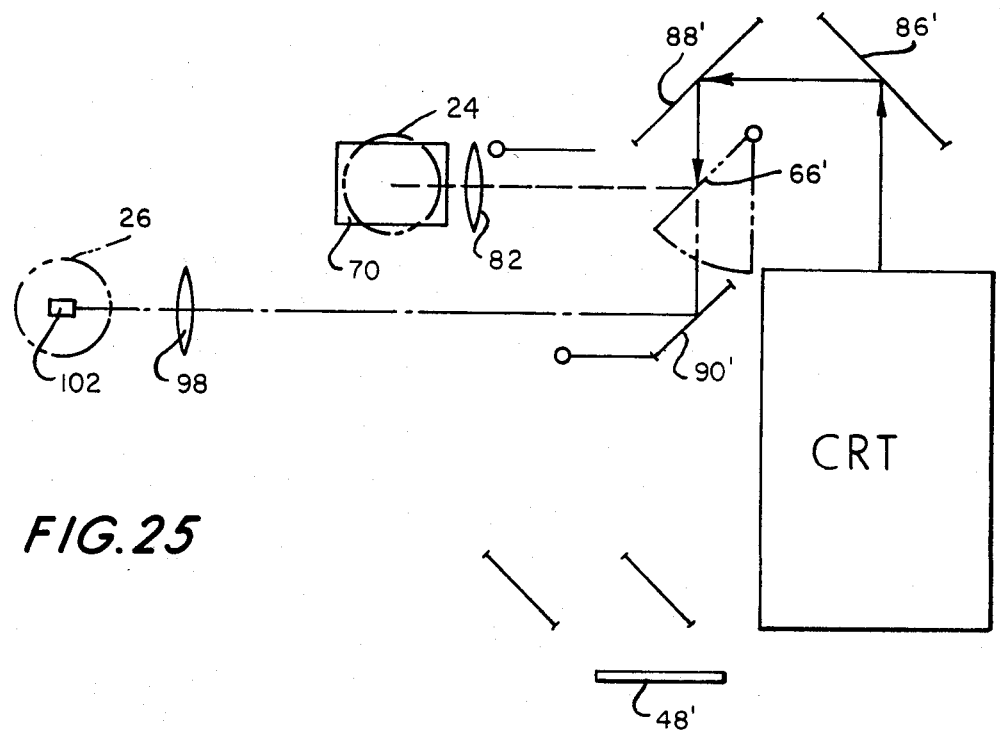
FIG. 25 is a schematic view illustrating optical components of an alternative embodiment of the invention.
Figure 26:
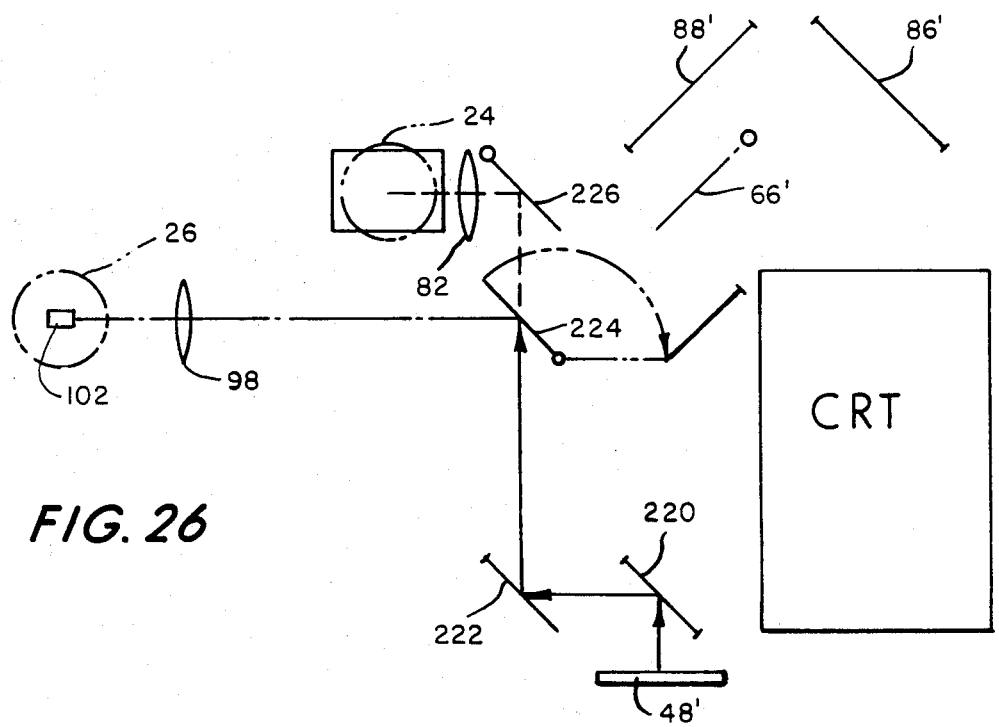
FIG. 26 is a schematic view illustrating the components shown in FIG. 25 but in a different operative condition.

In the alternative embodiment illustrated in FIGS. 25 and 26 of the drawings, an alternative system of optical paths is shown for presenting data to the respective recording and ID film planes with the mirrors 70 and 102 in a down or data position. In this embodiment, a substantial portion of the written information which appears on the identification card is presented by a cathode-ray tube CRT, whereas a data card tray 48' is employed solely for presenting such information as a signature or fingerprint to the respective film planes. Thus, in FIG. 25, the respective paths of light emanating from the CRT to the two film planes are represented again by dashed and dash-dot lines. A pivotal mirror 66' is again employed and is moveable between the two positions illustrated in FIG. 25 to expose, respectively, the ID and record camera film planes.

In FIG. 26, the optical path for presenting the fingerprint and signature supported on the data tray 48' is shown to include a pair of fixed mirrors 220 and 222 and a pair of pivotal mirrors 224 and 226. Thus, the optical path from the card 48' to the mirror 70 of the ID camera requires movement of the mirror 224 to the phantom line position illustrated in FIG. 6 and positioning of a pivotal mirror 226 as shown. An optical path to the mirror 102 of the recording camera is effected by moving the mirror 224 to the inclined solid-line position shown in FIG. 26.

Thus, it will be appreciated that as a result of the present invention, a highly effective identification card system is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A photographic identification camera of the type that produces a photoprint identification card having data and subject images in respective data and subject image areas thereof, and a record film image of the identification card, said identification card camera comprising:

means for supporting photosensitive film at first and second film planes, for supporting a data-carrying media, and for forming an image of a data-carrying media supported by said data-carrying media support means in a first area of the film at said first film plane and on the film at said second film plane and for forming an image of a subject in a second area of the film at said first film plane and on the film at said second film plane;

stored-program controlled processor means coupled to said first-mentioned means for effecting cyclic control of said first-mentioned means to expose an image of a data-carrying media to a first area of the film at said first film plane and to the film at said second film plane and to expose an image of a subject to a second area of the film at said first film plane and to the film at said second film plane.

2. The photographic identification camera claimed in claim 1, wherein:

said first-mentioned means supports a filmstrip at said second film plane for frame-by-frame incrementing thereof, said stored-program controlled processor means controlling said first-mentioned means to expose an image of the data-carrying media to a first frame of the filmstrip and to expose an image of the subject to a second frame of the filmstrip.

3. The photographic identification camera claimed in claim 2, wherein:

said stored-program controlled processor means increments the filmstrip at said second film plane one frame between exposures of the data-carrying media and the subject.

4. The photographic identification camera claimed in claim 3, wherein:

said stored-program controlled processor means monitors the positional status of the filmstrip at said second film plane during the exposure cycle and inhibits operation of said first-mentioned means when the filmstrip fails to increment one frame between exposures of the data-carrying media and the subject.

5. The photographic identification camera claimed in claim 1, wherein:

said data-carrying media support means comprises a moveable support surface, moveable between a first position and a second position in which second position the data-carrying media supported by said support surface is presented for forming an image thereof to the film at said first and second film planes.

6. The photographic identification camera claimed in claim 5, wherein:

said stored-program controlled processor means monitors the positional status of the data-carrying media support surface during the exposure cycle and inhibits operation of said first-mentioned means when the support surface is moved from its second position during execution of the exposure cycle.

7. The photographic identification camera claimed in claim 1, wherein said data-carrying media comprises:

an electronically driven data display.

8. The photographic identification camera claimed in claim 7, wherein said electronically drive data display means comprises:

an electro-luminescent display means.

9. The photographic identification camera claimed in claim 8, wherein said electro-luminescent display means comprises:

a cathode-ray-tube display screen.

10. The photographic identification camera claimed in claim 1, wherein:

said stored-program controlled processor means monitors the positional status of the data-carrying media during the exposure cycle and inhibits operation of said first-mentioned means when an unexpected change in positional status of the data-carrying media is detected during execution of the exposure cycle.

11. The photographic identification camera claim in claim 1, wherein:

said stored-program controlled processor means monitors the positional status of the film at said first film plane during the exposure cycle and inhibits operation of said first-mentioned means when an unexpected change in positional status of the film at said first film plane is detected during execution of the exposure cycle.

12. The photographic identification camera claimed in claim 1, wherein:

said stored-program controlled processor means monitors the positional status of the film at said second plane during the exposure cycle and inhibits operation of the first-mentioned means when an unexpected change in the positional status of the film at said second film plane is detected during execution of the exposure cycle.

13. The photographic identification camera claimed in claim 1, wherein:

said first-mentioned means comprises first and second selectively moveable mirrors moveable to respective first predetermined positions to permit exposure of the data-carrying media to the film at said first film plane and the film at said second film plane and moveable to respective second predetermined positions to permit exposure of a subject to the film at said first film plane and the film at said second film plane, said stored-program controlled processor means monitoring the positional status of said first and second selectively moveable mirrors and inhibiting operation of said first-mentioned means when either of said first or second mirrors fails to move to either of their predetermined first and second positions during exposures.

14. A photographic identification camera of the type that produces a photoprint identification card having data and subject images in respective data and subject image areas thereof and a record film image of the identification card, said identification card camera comprising:

means for supporting photosensitive film at first and second film planes, for supporting a data-carrying media, and for forming an image of a data-carrying media supported by said data-carrying media support means in a first area of the film at said first film plane and on the film at said second film plane and for forming an image of a subject in a second area of the film at said first film plane and on the film at said second film plane; and processor means coupled to said first-mentioned means for effecting cyclic control of said first-mentioned means to expose an image of a data-carrying media to a first area of the film at said first film plane and to the film at said second film plane and to expose an image of a subject to a second area of the film at said first film plane and to the film at said second film plane, said processor means operative in response to a memory-stored first instruction sequence to provide operational commands to said first-mentioned means to effect the imaging of the data-carrying media and the subject, the first instruction sequence querying at least one selected memory location containing status information relating to said first-mentioned means to determine if an operational command has been effected and terminating operation of said first-mentioned means where at least one operational command has not been effected.

15. The photographic identification camera claimed in claim 14, wherein:

the first instruction sequence unconditionally enters a second instruction sequence at the end of a recurring time period, the second instruction sequence querying the status of said first-mentioned means and providing the periodically obtained status information to associated memory locations to be queried by the first instruction sequence.

16. The photographic identification camera claimed in claim 14, wherein:

said first-mentioned means includes moveable components moveable between a first operative position and a second inoperative position, the second instruction sequence periodically querying the positional status of said moveable and providing the so queried status information to an associated memory location queried by the first instruction sequence.

17. The photographic identification camera claimed in claim 14, wherein:

said first-mentioned means includes a moveable support surface for supporting the data-carrying media and moveable between a first operative position and a second inoperative position, the second instruction sequence periodically querying the positional status of the moveable support surface and providing the so-queried status information to an associated memory location queried by the first instruction sequence.

18. The photographic identification camera claimed in claim 14, wherein:

said first-mentioned means includes optical components moveable in response to operational commands provided by the first instruction sequence between a first operative position for effecting imaging of the data-carrying media and a second operative position for effecting imaging of the subject, the second instruction sequence periodically querying the status of said optical components and providing the so queried status information to associated memory locations queried by the first instruction sequence.

19. The photographic identification camera claimed in claim 14, wherein:

said first-mentioned means includes mirror means moveable in response to operational commands provided by the first instruction sequence between first operative position for effecting imaging of the data-carrying media and a second operative position for effecting imaging of the subject, the second instruction sequence periodically querying the status thereof and providing the so-queried information to associated memory locations queried by the first instruction sequence.

20. The photographic identification camera claimed in claim 14, wherein:

said first-mentioned means includes strobescopic illumination means chargeable to a fully charged condition and triggerable to an uncharged condition, the second instruction sequence periodically querying the charge status of said strobescopic illumination means, and providing the so queried status information to an associated memory location queried by the first instruction sequence.

21. The photographic identification camera claimed in claim 14, wherein:

the film at said second film plane is defined by a filmstrip and said first-mentioned means includes filmstrip advancing means for incremently advancing said filmstrip on a frame-by-frame basis, the second instruction sequence periodically querying the film advancing means and providing status information to an associated memory location indicating framewise advancement of said filmstrip in response to a operational command provided by the first instruction sequence.

22. The photographic identification camera claimed in claim 21, wherein:

the second instruction sequence periodically queries the filmstrip quantity and provides the so queried quantity status information to an associated memory location queried by the first instruction sequence.

23. The photographic identification camera claimed in claim 22, wherein:

the first instruction sequence conditionally enters a third instruction sequence to provide operational commands to the first-mentioned means during the changing of the filmstrip.

24. The photographic identification camera claimed in claim 15, wherein:

the first instruction sequence conditionally enters a forth instruction sequence, the forth instruction sequence controlling said first-mentioned means to control the exposure of the film at said second film plane.

25. The photographic identification camera claimed in claim 24, wherein:

said first-mentioned means includes a photocell for measuring the light at said second film plane, the second instruction sequence querying said photocell and providing the queried status information to an associated memory location.

* * * * *